United States Patent
Nonoshita et al.

(10) Patent No.: US 9,365,261 B2
(45) Date of Patent: Jun. 14, 2016

(54) COMPOSITE BICYCLE COMPONENT, COMPOSITE BICYCLE CRANK ARM, AND METHOD FOR MANUFACTURING COMPOSITE BICYCLE COMPONENT

(71) Applicant: SHIMANO INC., Sakai (JP)

(72) Inventors: Tetsu Nonoshita, Sakai (JP); Masahiro Yamanaka, Sakai (JP)

(73) Assignee: SHIMANO INC., Sakai (JP)

( * ) Notice: Subject to any disclaimer, the term of this patent is extended or adjusted under 35 U.S.C. 154(b) by 215 days.

(21) Appl. No.: 13/929,794

(22) Filed: Jun. 28, 2013

(65) Prior Publication Data

US 2015/0000459 A1 Jan. 1, 2015

(51) Int. Cl.
*B62M 3/00* (2006.01)
*B62K 19/16* (2006.01)

(52) U.S. Cl.
CPC .................. *B62M 3/00* (2013.01); *B62K 19/16* (2013.01); *Y10T 29/49826* (2015.01); *Y10T 74/2164* (2015.01)

(58) Field of Classification Search
CPC ..... B62M 3/00; B62K 19/16; Y10T 74/2164; Y10T 74/2165; Y10T 29/49826
See application file for complete search history.

(56) References Cited

U.S. PATENT DOCUMENTS

| | | | |
|---|---|---|---|
| 5,184,874 A * | 2/1993 | Olson et al. .............. 301/64.705 |
| 7,527,277 B2 * | 5/2009 | Nonoshita et al. ............. 280/259 |
| 8,246,776 B2 * | 8/2012 | Iwasawa ............. B29C 65/5035 156/295 |
| 2009/0165947 A1 | 7/2009 | Iwasawa et al. |
| 2012/0003408 A1 | 1/2012 | Nonoshita |
| 2012/0042746 A1 * | 2/2012 | Nonoshita et al. ........... 74/594.2 |

FOREIGN PATENT DOCUMENTS

| | | |
|---|---|---|
| DE | 10 2008 062 020 | 7/2009 |
| JP | 2008-001287 | 1/2008 |
| WO | WO 03/000543 | 1/2003 |

OTHER PUBLICATIONS

German Search Report for corresponding DE Application No. 10 2014 108 900.6, Dec. 7, 2015.

* cited by examiner

*Primary Examiner* — Thomas Diaz
(74) *Attorney, Agent, or Firm* — Mori & Ward, LLP

(57) ABSTRACT

A composite bicycle component comprises a first member, a second member, a bonding member, and an inner holding member. The first member is made of metallic material. The second member is made of non-metallic material. The first and second members are configured to form an interior cavity therebetween in a state where the first and second members are attached to each other. The bonding member is configured to attach the first and second members to each other. The inner holding member is configured to be disposed within the interior cavity so as to prevent the first and second members from being separated from each other until completion of attaching the first and second members to each other.

36 Claims, 17 Drawing Sheets

COMPOSITE BICYCLE COMPONENT, COMPOSITE BICYCLE CRANK ARM, AND METHOD FOR MANUFACTURING COMPOSITE BICYCLE COMPONENT

BACKGROUND OF THE INVENTION

1. Field of the Invention

The present invention relates to a composite bicycle component, a composite bicycle crank arm, and a method for the composite bicycle component.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

The technological requirements of bicycle components include high strength in order to prevent damage or deformation despite the bicycle components being repeatedly subjected to loads, and high rigidity in order to prevent deformation or unpleasant sensations when the loads are applied to the bicycle components.

The technological requirements of the bicycle components further include weight saving in order to reduce the weight of the entire bicycle.

SUMMARY OF THE INVENTION

In accordance with a first aspect of the present invention, a composite bicycle component comprises a first member, a second member, a bonding member, and an inner holding member. The first member is made of metallic material. The second member is made of non-metallic material. The first and second members are configured to form an interior cavity therebetween in a state where the first and second members are attached to each other. The bonding member is configured to attach the first and second members to each other. The inner holding member is configured to be disposed within the interior cavity so as to prevent the first and second members from being separated from each other until completion of attaching the first and second members to each other.

In accordance with a second aspect of the present invention, the composite bicycle component according to the first aspect is configured so that the bonding member includes resin.

In accordance with a third aspect of the present invention, the composite bicycle component according to the first aspect is configured so that the bonding member includes adhesive.

In accordance with a fourth aspect of the present invention, the composite bicycle component according to the first aspect is configured so that the first member includes aluminum.

In accordance with a fifth aspect of the present invention, the composite bicycle component according to the fourth aspect is configured so that the second member includes non-metallic fiber material, and the bonding member includes resin and is dispersed into the second member to form fiber reinforced plastic.

In accordance with a sixth aspect of the present invention, the composite bicycle component according to the first aspect is configured so that the first member includes iron.

In accordance with a seventh aspect of the present invention, the composite bicycle component according to the first aspect is configured so that the second member includes non-metallic fiber material, and the bonding member includes resin and is dispersed into the second member to form fiber reinforced plastic.

In accordance with an eighth aspect of the present invention, the composite bicycle component according to the first aspect is configured so that the second member includes fiber reinforced plastic, and the bonding member includes adhesive to attach the second member to the first member.

In accordance with a ninth aspect of the present invention, the composite bicycle component according to the first aspect is configured so that the inner holding member is configured to be soluble in liquid.

In accordance with a tenth aspect of the present invention, the composite bicycle component according to the first aspect is configured so that the inner holding member includes an inflatable bag.

In accordance with an eleventh aspect of the present invention, a composite bicycle component comprises a first member, a second member, and a bonding member. The first member is made of metallic material. The second member is made of non-metallic material. The first and second members are configured to form an interior cavity therebetween in a state where the first and second members are attached to each other. The bonding member is configured to attach the first and second members to each other. The composite bicycle component is manufactured with a method comprises providing the first and second members, fitting the first and second members together, providing the bonding member to the second member after fitting the first and second members together, and attaching the first and second members to each other through the bonding member by an integral molding process.

In accordance with a twelfth aspect of the present invention, the composite bicycle component according to the eleventh aspect further comprises an inner holding member. The composite bicycle component is manufactured with the method further comprising providing the inner holding member between the first and second members before fitting the first and second members together.

In accordance with a thirteenth aspect of the present invention, the composite bicycle component according to the eleventh aspect is configured so that the bonding member is provided to the second member by a vacuum-assisted-resin-transfer-molding process.

In accordance with a fourteenth aspect of the present invention, the composite bicycle component according to the thirteenth aspect further comprises an inner holding member. The composite bicycle component is manufactured with the method further comprising providing the inner holding member between the first and second members before fitting the first and second members together.

In accordance with a fifteenth aspect of the present invention, a method for manufacturing a composite bicycle component comprises providing the first and second members, fitting the first and second members together, providing the bonding member to the second member after fitting the first and second members together, and attaching the first and second members to each other through the bonding member by an integral molding process.

In accordance with a sixteenth aspect of the present invention, the method according to the fifteenth aspect further comprises providing an inner holding member between the first and second members before fitting the first and second members together.

In accordance with a seventeenth aspect of the present invention, the method according to the fifteenth aspect is configured so that the bonding member is provided to the second member by a vacuum-assisted-resin-transfer-molding process.

In accordance with an eighteenth aspect of the present invention, the method according to the seventeenth aspect further comprises providing an inner holding member between the first and second members before fitting the first and second members together.

In accordance with a nineteenth aspect of the present invention, a composite bicycle crank arm comprises a first member, a second member, and a bonding member. The first member is made of metallic material. The second member is made of non-metallic material. The bonding member is configured to attach the first and second members to each other.

In accordance with a twentieth aspect of the present invention, the composite bicycle crank arm according to the nineteenth aspect is configured so that the first and second members are configured to form an interior cavity therebetween in a state where the first and second members are attached to each other.

In accordance with a twenty-first aspect of the present invention, the composite bicycle crank arm according to the twentieth aspect further comprises an inner holding member configured to be disposed within the interior cavity so as to prevent the first and second members from being separated from each other until completion of attaching the first and second members to each other.

In accordance with a twenty-second aspect of the present invention, the composite bicycle crank arm according to the nineteenth aspect further comprises an inner holding member configured to prevent the first and second members from being separated from each other until completion of attaching the first and second members to each other.

In accordance with a twenty-third aspect of the present invention, the composite bicycle crank arm according to the nineteenth aspect is configured so that the first member includes aluminum.

In accordance with a twenty-fourth aspect of the present invention, the composite bicycle crank arm according to the twenty-third aspect is configured so that the second member includes non-metallic fiber material, and the bonding member includes resin and is dispersed into the second member to form fiber reinforced plastic.

In accordance with a twenty-fifth aspect of the present invention, the composite bicycle crank arm according to the nineteenth aspect is configured so that the second member includes fiber reinforced plastic.

In accordance with a twenty-sixth aspect of the present invention, the composite bicycle crank arm according to the twenty-fifth aspect is configured so that the bonding member includes adhesive to attach the second member to the first member.

In accordance with a twenty-seventh aspect of the present invention, the composite bicycle crank arm according to the nineteenth aspect is configured so that the inner holding member is configured to be soluble in liquid.

In accordance with a twenty-eighth aspect of the present invention, the composite bicycle crank arm according to the nineteenth aspect is configured so that the inner holding member includes an inflatable bag.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
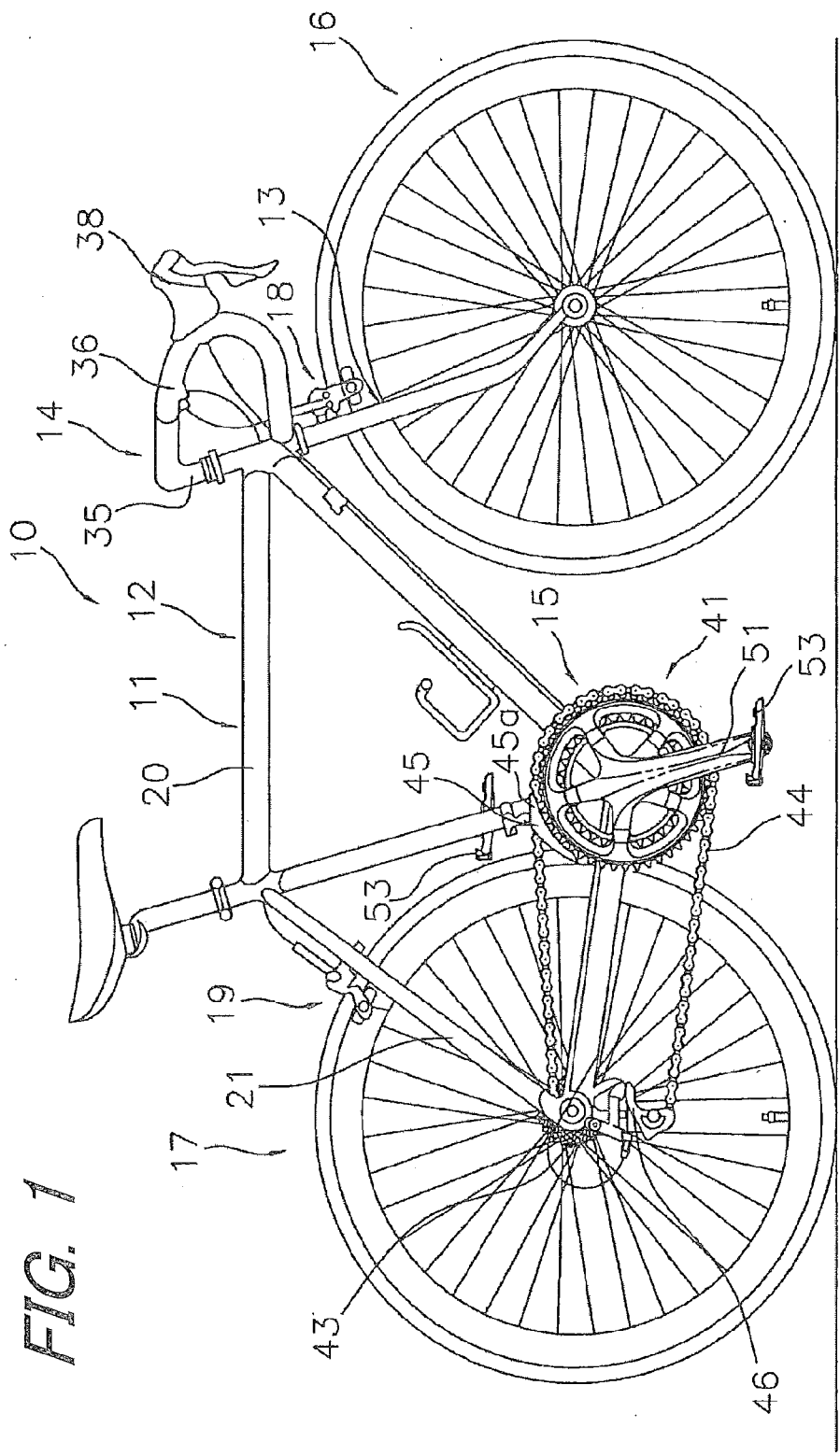
FIG. 1 is a right side elevational view of a bicycle with bicycle crank arms in accordance with a first embodiment of the present invention.

The embodiments will now be described with reference to the accompanying drawings, wherein like reference numerals designate corresponding or identical elements throughout the various drawings.

First Embodiment

Referring initially to FIG. 1, a bicycle 10 is illustrated in accordance with a first embodiment of the present invention.

As seen in FIG. 1, the bicycle 10 is a "road racer" (racing style road bike) that has a diamond-shaped frame 11 that serves as the framework of the bicycle. The frame 11 has a frame body 12 and a front fork 13 attached thereto. The bicycle 10 also has a drop-type handlebar unit 14 attached to the front fork 13. The front fork 13 is supported on a front part of the frame body 12 such that it can rotate freely about an axis that is tilted slightly from vertical. The lower part of the front fork 13 is divided into two prongs. The bicycle 10 also has a drive train 15, a front wheel 16, a rear wheel 17, a front brake device 18, and a rear brake device 19. The drive train 15 is configured to convert the rider's pedaling force into driving force. The front wheel 16 is supported in a freely rotatable manner on the bottom end of the front fork 13. The rear wheel 17 is supported in a freely rotatable manner on a rear part of the frame body 12.

The frame body 12 has a triangularly shaped main or front triangle 20 and a triangularly shaped rear triangle 21 that is arranged rearward of the front triangle 20. The front triangle 20 is formed by a top tube, a down tube, head tube and a seat tube. The frame body 12 also has a cylindrical hanger 29 (FIG. 2).

As shown in FIG. 1, the handlebar unit 14 includes a handlebar stem 35 and a handlebar 36. The handlebar stem 35 of the handlebar unit 14 is fastened to the upper part of the front fork 13 in such a manner that it can be vertically moved up and down. The handlebar 36 is fixed at a horizontally extending center portion on a top edge of the handlebar stem 35 with both free ends having curved portions extending from the center portion. Brake levers 38 provided with a gear shifting capability are mounted on both ends of the handlebar 36.

The drive train 15 includes a front crank unit 41, a rear gear cassette unit 43, a chain 44, a front derailleur 45, and a rear derailleur 46. The front crank unit 41 is provided on the cylindrical hanger 29 (FIG. 2) of the bicycle 10. The rear gear cassette unit 43 is mounted in a non-rotatable manner to the free hub of the rear wheel 17. The chain 44 is arranged on the front crank unit 41 and the rear gear cassette unit 43 so as to span therebetween. The front derailleur 45 and the rear derailleur 46 function as gear changing devices. The front derailleur 45 has a chain guide 45a where the chain 44 is inserted. The front crank unit 41 has a right crank arm 51, a left crank arm 52 (FIG. 2), a pair of pedals 53, a crank axle 54 (FIG. 2) and a bottom bracket 55 (FIG. 2).

Figure 2:
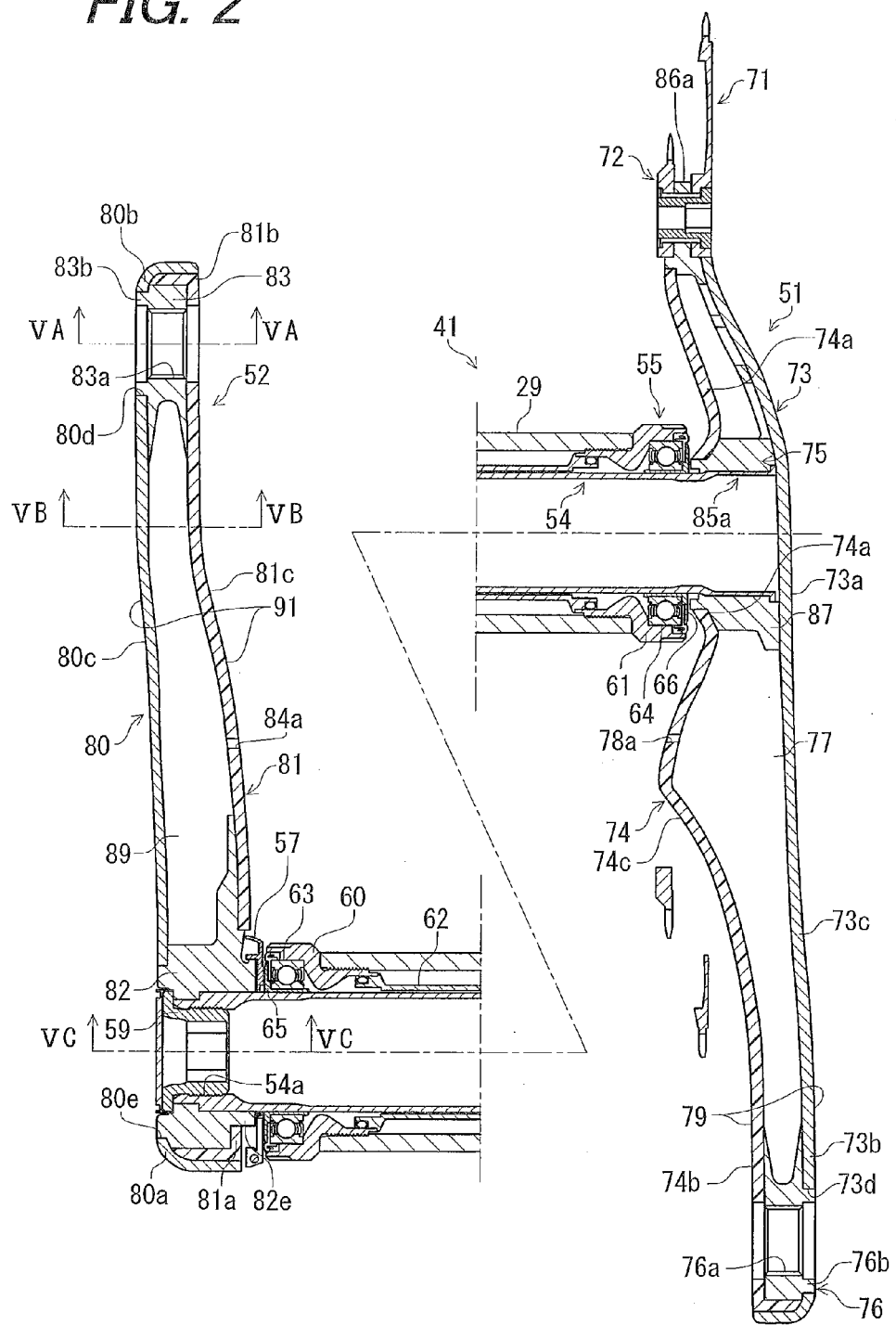
FIG. 2 is a transverse cross sectional view of a bicycle crank axle assembly with the bicycle crank arms in accordance with the first embodiment of the present invention.

Referring to FIG. 2, the bottom bracket 55 is mounted on the hanger 29 with the crank axle 54. The crank axle 54 is rotatably supported in the cylindrical hanger 29 of the frame body 12 by the bottom bracket 55.

The bottom bracket 55 comprises left and right bearing housings 60 and 61, a cylindrical connecting member 62, left and right bearings 63 and 64 and left, and optionally right cover members 65 and 66. The left and right bearing housings 60 and 61 are threaded into the ends of the hanger 29. The cylindrical connecting member 62 concentrically connects the left and right bearing housings 60 and 61. The left and right bearings 63 and 64 are mounted in the left and right bearing housings 60 and 61. The left and right cover members 65 and 66 are mounted between the crank axle 54 and the inner rings of the left and right bearings 63 and 64. The connecting member 62 is a cylindrical member having an inside diameter that allows the crank axle 54 to pass through.

As shown in FIG. 2, the left and right bearing housings 60 and 61 are stepped cylindrical members. External threads of the left and right bearing housings 60 and 61 are screwed into internal threads of the hanger 29 at the left and right ends.

The bearings 63 and 64 are ball bearings or other roll bearings. The bearings 63 and 64 are sealed bearings in which seals are placed between the inner rings and the outer rings, and grease is applied in advance.

The cover members 65 and 66 are made of a hard synthetic resin, e.g., and are provided to cover the outer end surfaces of the bearing housings 60 and 61. The cover members 65 and 66 are enclosed between the left and right crank arms 52 and 51 and the inner rings of the bearings 63 and 64. The left and right cover members 65 and 66 can be omitted according to need.

The crank axle 54 is preferably a hollow pipe-shaped member made of chrome-molybdenum steel or another such highly rigid alloy, for example. The right crank arm 51 is integrally fixed to the right end of the crank axle 54. The right end of the crank axle 54 is fixed to the right crank arm 51 by press-fitting or by adhesive. One of the pedals 53 (FIG. 1) is mounted on the distal end of the right crank arm 51, and the other of the pedals 53 (FIG. 1) is mounted on the distal end of the left crank arm 52. The left crank arm 52 is detachably fixed to the left end of the crank axle 54. The internal thread 54a is formed in the internal peripheral surface at the left end of the crank axle 54 for threadedly fastening a bolt 59 to retain the left crank arm 52 on the left end of the crank axle 54.

As shown in FIG. 2, the right crank arm 51 comprises a first member 73, a non-metallic member 74, and further may comprise a first connecting member 75 and a second connecting member 76. The first member 73 is made of metallic material such as aluminum, aluminum alloy, or iron. The first member 73 preferably contains aluminum and is preferably made of aluminum. The non-metallic member 74 is made of fiber reinforced plastic, preferably carbon fiber reinforced plastic containing carbon fiber material and matrix resin. It should be understood that the non-metallic member 74 can be made of other fiber reinforced plastics. As discussed above, the right crank arm 51 is a composite bicycle component (a composite bicycle crank arm) including metallic material and non-metallic material.

The first member 73 and the non-metallic member 74 are configured to form an interior cavity 77 therebetween in a state where the first member 73 and the non-metallic member 74 are attached to each other. The first connecting member 75 is disposed in the interior cavity 77 and is configured to be connected to the crank axle 54. The second connecting member 76 is disposed in the interior cavity 77 and is configured to be connected to one of the pedals 53. The non-metallic member 74 preferably has a through-hole 78a. The interior cavity 77 can communicate with the exterior of the right crank arm 51 via the through-hole 78a. The through-hole 78a can be formed by machining, for example.

The left crank arm 52 comprises a first member 80, a non-metallic member 81, and further may comprise a first connecting member 82 and a second connecting member 83. The first member 80 is made of metallic material such as aluminum, aluminum alloy, or iron. The first member 80 preferably contains aluminum and is preferably made of aluminum. The non-metallic member 81 is made of fiber reinforced plastic, preferably carbon-fiber reinforced plastic containing carbon fiber material and matrix resin. It should be understood that the non-metallic member 81 can be made of other fiber reinforced plastics. As discussed above, the left crank arm 52 is a composite bicycle component (a composite bicycle crank arm) including metallic material and non-metallic material.

The first member 80 and the non-metallic member 81 are configured to form an interior cavity 89 therebetween in a state where the first member 80 and the non-metallic member

81 are attached to each other. The first connecting member 82 is disposed in the interior cavity 89 and is configured to be connected to the crank axle 54. The second connecting member 83 is disposed in the interior cavity 89 and is configured to be connected to the other of the pedals 53. The non-metallic member 81 preferably has a through-hole 84a. The interior cavity 89 can communicate with the exterior of the left crank arm 52 via the through-hole 84a. The through-hole 84a can be formed by machining, for example.

Figure 3:
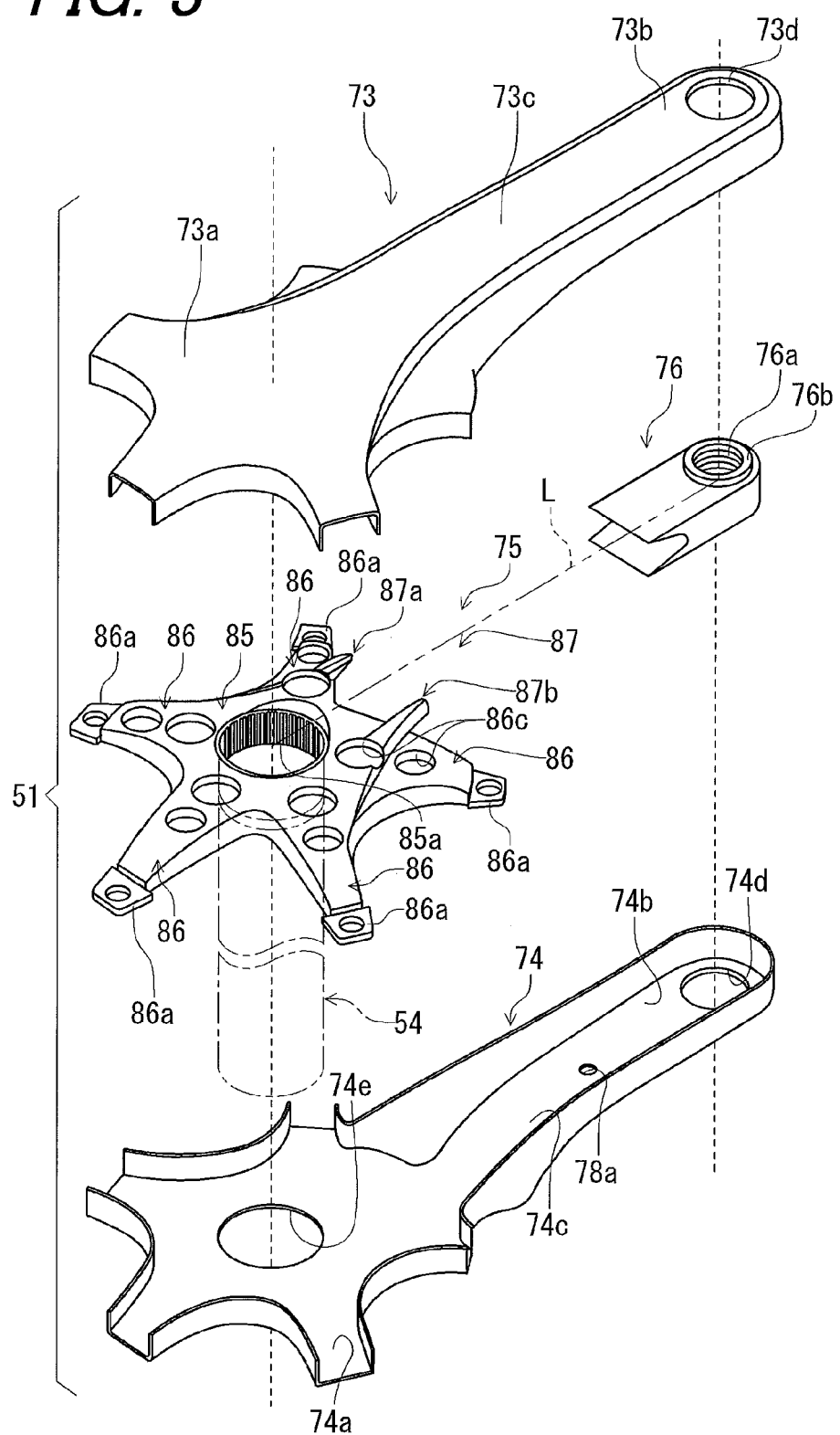
FIG. 3 is an exploded perspective view of a right crank arm illustrated in FIG. 2.

FIG. 3 is an exploded perspective view of the right crank arm 51. Referring to FIG. 3, the first connecting member 75 of the right crank arm 51 is a substantially starfish-shaped member made of metallic material such as aluminum alloy, magnesium alloy, titanium alloy, or other light metal. The first connecting member 75 is preferably made of aluminum alloy whose surface is provided with an alumite finish. The first connecting member 75 is disposed at the proximal end of the right crank arm 51. The first connecting member 75 has an axle-attaching part 85 disposed in the center, five arm parts 86 extending radially in five directions from the axle-attaching part 85, and an extended part 87 that extends from the axle-attaching part 85 toward the second connecting member 76.

The first connecting hole 85a is formed in the center of the axle-attaching part 85 for fastening the crank axle 54 by press-fitting or by adhesive. Serrations are formed in the internal peripheral surface of the first connecting hole 85a for securing the crank axle 54.

Sprocket attachment parts 86a are formed at the distal ends of the five arm parts 86 for fastening sprockets 71 and 72 (FIG. 2). The sprocket attachment parts 86a are machined into plate shapes. Perforated holes 86c are also formed from the axle-attaching part 85 to the arm parts 86 for weight saving.

As shown in FIG. 3, the extended part 87 has a first rib 87a and a second rib 87b arranged between two arm parts 86 so as to be side by side with respect to the rotational direction of the right crank arm 51. The first rib 87a is arranged to the left (i.e., to the left from the perspective of FIG. 3) of an imaginary line segment L indicated as a double-dot chain line in FIG. 3. The second rib 87b is located to the right of the imaginary line segment L. The imaginary line segment L joins the centers of the first connecting hole 85a and a second connecting hole 76a of the second connecting member 76.

The second connecting member 76 is made of metallic material such as aluminum alloy, magnesium alloy, titanium alloy, or other light metal. The second connecting member 76 is preferably made of aluminum alloy whose surface is provided with an alumite finish, as well as the first connecting member 75. The second connecting member 76 has a plate shape that is rounded at one end. The second connecting member 76 is disposed at the distal end of the right crank arm 51. The second connecting member 76 has the second connecting hole 76a into which the pedal axle (not shown) of the pedal 53 is screwed. An annular protrusion 76b is formed in the periphery of the second connecting hole 76a in the external side of the second connecting member 76. The protrusion 76b is exposed to the outside from a through-hole 73d of the first member 73 (FIG. 2).

As shown in FIG. 3, the first member 73 covers the first and second connecting members 75 and 76. The first member 73 has a first cover part 73a to cover the first connecting member 75, a second cover part 73b to cover the second connecting member 76, and an intermediate cover part 73c disposed between the first and second connecting members 75 and 76.

The first cover part 73a is configured three-dimensionally so as to entirely cover the externally facing surface of the first connecting member 75, except for the sprocket attachment parts 86a. The first cover part 73a is further configured three-dimensionally so as to entirely cover the periphery of the first connecting member 75, except for the peripheral side of the first connecting member 75 facing the second connecting member 76.

The second cover part 73b is configured three-dimensionally so as to entirely cover the externally facing surface of the second connecting member 76, except for the protrusion 76b. The second cover part 73b is further configured three-dimensionally so as to entirely cover the periphery of the second connecting member 76, except for the peripheral side of the second connecting member 76 facing the first connecting member 75. The through-hole 73d is formed in the second cover part 73b for exposing the protrusion 76b. The intermediate cover part 73c is formed integrally with the first and second cover parts 73a and 73b so as to allow the first and second cover parts 73a and 73b to be smoothly connected.

The non-metallic member 74 covers the first and second connecting members 75 and 76 together with the first member 73. The non-metallic member 74 has a first cover part 74a to cover the first connecting member 75, a second cover part 74b to cover the second connecting member 76, and an intermediate cover part 74c disposed between the first and second connecting members 75 and 76.

The first cover part 74a is configured three-dimensionally so as to entirely cover the externally facing surface of the first connecting member 75, except for the sprocket attachment parts 86a. The first cover part 74a is further configured three-dimensionally so as to entirely cover the periphery of the first connecting member 75, except for the peripheral side of the first connecting member 75 facing the second connecting member 76. A through-hole 74e is formed in the center of the first cover part 74a to allow the crank axle 54 to be inserted.

The second cover part 74b is configured three-dimensionally so as to entirely cover the externally facing surface of the second connecting member 76, except for the periphery of the second connecting hole 76a. The second cover part 74b is further configured three-dimensionally so as to entirely cover the periphery of the second connecting member 76, except for the peripheral side of the second connecting member 76 facing the first connecting member 75. The second cover part 74b has a through-hole 74d formed for inserting an Allen key or another such tool when attaching or removing the pedal 53. The intermediate cover part 74c is formed integrally with the first and second cover parts 74a and 74b so as to allow the first and second cover parts 74a and 74b to be smoothly connected. The intermediate part of the intermediate cover part 74c is preferably formed to protrude inward as shown in FIG. 2, in order to improve strength.

Figure 4:
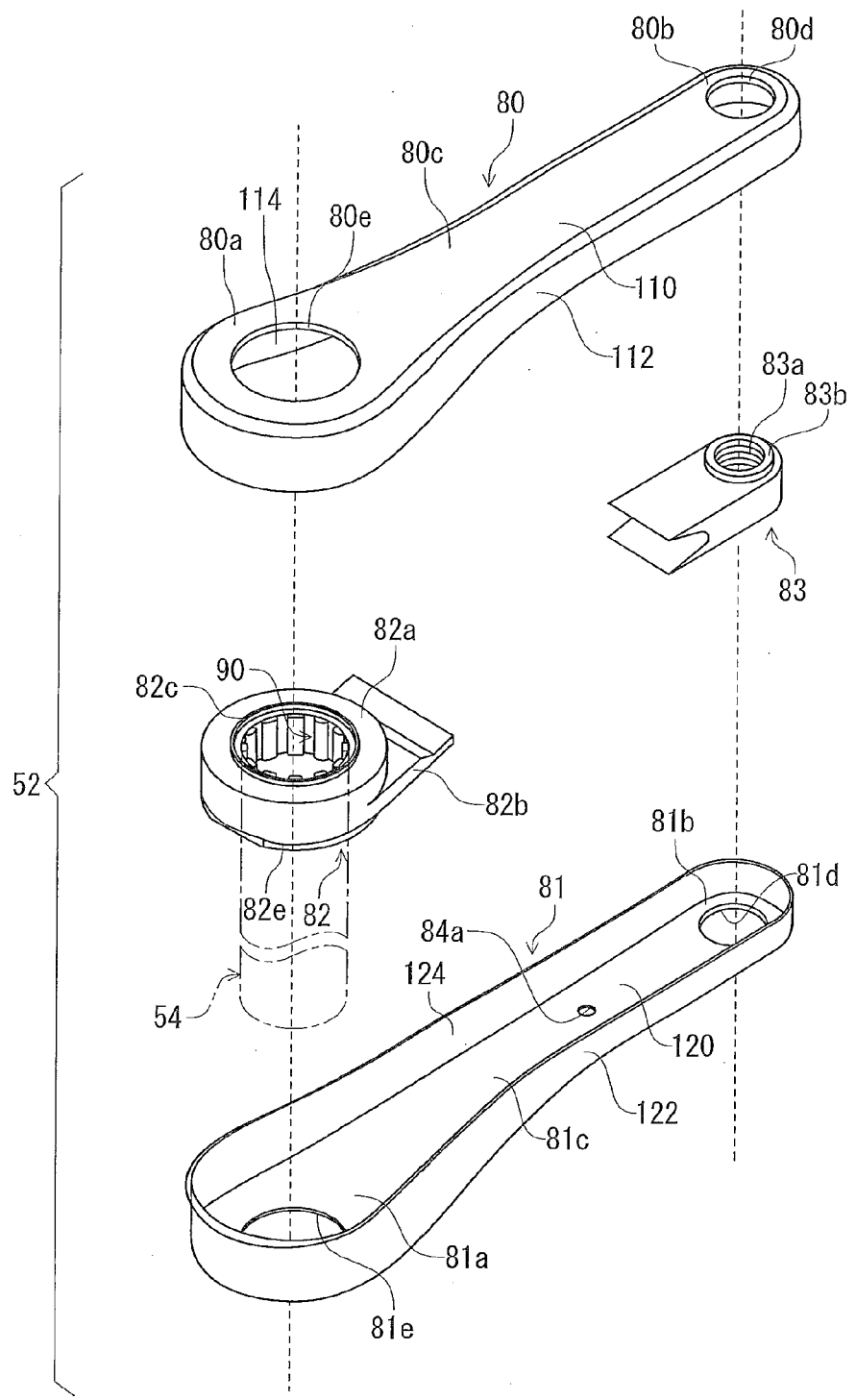
FIG. 4 is an exploded perspective view of a left crank arm illustrated in FIG. 2.

Referring to FIG. 4, the first connecting member 82 of the left crank arm 52 is a substantially cylindrical member made of metallic material such as aluminum alloy, magnesium alloy, titanium alloy, or other light metal. The first connecting member 82 is preferably made of aluminum alloy whose surface is provided with an alumite finish. The first connecting member 82 has an axle mounting part 82a disposed in the center, and a plate-shaped crank reinforcing part 82b extending from the axle mounting part 82a. A first connecting hole 90 is formed in the center of the axle mounting part 82a. The first connecting hole 90 is connected with the left end of the crank axle 54. The crank reinforcing part 82b has a plate shape that extends towards the second connecting member 83 and that reinforces the inner surface of the non-metallic member 81. The first connecting member 82 further includes a first annular protrusion 82c and a second annular protrusion 82e. The first annular protrusion 82c protrudes from the axle mounting part 82a and is disposed about the first connecting hole 90. The second annular protrusion 82e protrudes from the axle mounting part 82a toward a side opposite to the first annular protrusion 82c with respect to the axle mounting part 82a and is disposed about the first connecting hole 90.

As shown in FIG. 4, the second connecting member 83 has substantially the same shape as the second connecting member 76 of the right crank arm 51. The second connecting member 83 is made of metallic material such as aluminum alloy, magnesium alloy, titanium alloy, or other light metal. The second connecting member 83 is preferably made of aluminum alloy whose surface is provided with an alumite finish, as well as the first connecting member 82. The second connecting member 83 has a plate shape that is rounded at one end. The second connecting member 83 is disposed at the distal end of the left crank arm 52. The second connecting member 83 has the second connecting hole 83a into which the pedal axle (not shown) of the pedal 53 is screwed. An annular protrusion 83b is formed in the periphery of the second connecting hole 83a on the external side of the second connecting member 83. The protrusion 83b is exposed to the outside from a through-hole 80d of the first member 80 (FIG. 2).

As shown in FIG. 4, the first member 80 covers the first and second connecting members 82 and 83. The first member 80 has a first cover part 80a to cover the first connecting member 82, a second cover part 80b to cover the second connecting member 83, and an intermediate cover part 80c disposed between the first and second connecting members 82 and 83.

The first cover part 80a is configured three-dimensionally so as to entirely cover the periphery of the first connecting member 82, except for the peripheral side of the first connecting member 82 facing the second connecting member 83. A through-hole 80e is formed in the first cover part 80a for exposing the first annular protrusion 82c of the first connecting member 82.

The second cover part 80b is configured three-dimensionally so as to entirely cover the externally facing surface of the second connecting member 83, except for the protrusion 83b. The second cover part 80b is further configured three-dimensionally so as to entirely cover the periphery of the second connecting member 83, except for the peripheral side of the second connecting member 83 facing the first connecting member 82. A through-hole 80d is formed in the second cover part 80b for exposing the protrusion 83b. The intermediate cover part 80c is formed integrally with the first and second cover parts 80a and 80b so as to allow the first and second cover parts 80a and 80b to be smoothly connected.

The non-metallic member 81 covers the first and second connecting members 82 and 83 together with the first member 80. The non-metallic member 81 has a first cover part 81a to cover the first connecting member 82, a second cover part 81b to cover the second connecting member 83, and an intermediate cover part 81c disposed between the first and second connecting members 82 and 83.

The first cover part 81a is configured three-dimensionally so as to entirely cover the periphery of the first connecting member 82, except for the peripheral side of the first connecting member 82 facing the second connecting member 83. A through-hole 81e is formed in the first cover part 81a for partly exposing the first connecting member 82.

The second cover part 81b is configured three-dimensionally so as to entirely cover the external surface of the second connecting member 83, except for the periphery of the second connecting hole 83a. The second cover part 81b is further configured three-dimensionally so as to entirely cover the periphery of the second connecting member 83, except for the peripheral side of the second connecting member 83 facing the first connecting member 82. The second cover part 81b has a through-hole 81d formed for inserting an Allen key or another such tool when attaching or removing the pedal 53. The intermediate cover part 81c is formed integrally with the first and second cover parts 81a and 81b so as to allow the first and second cover parts 81a and 81b to be smoothly connected.

Figure 5A:
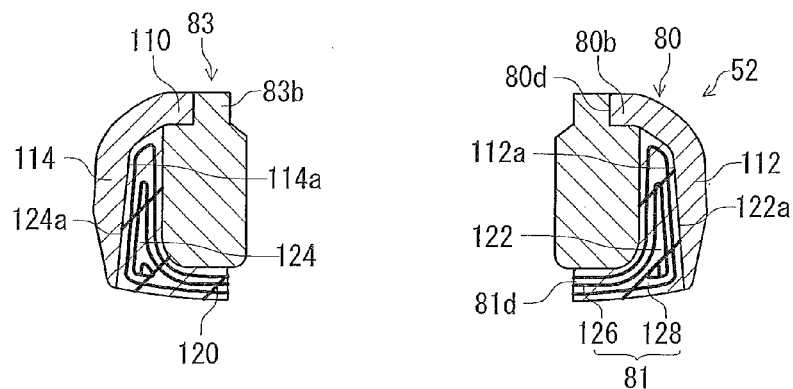
FIG. 5A is a schematic cross-sectional view of the left crank arm taken along line VA-VA of FIG. 2.
Figure 5B:
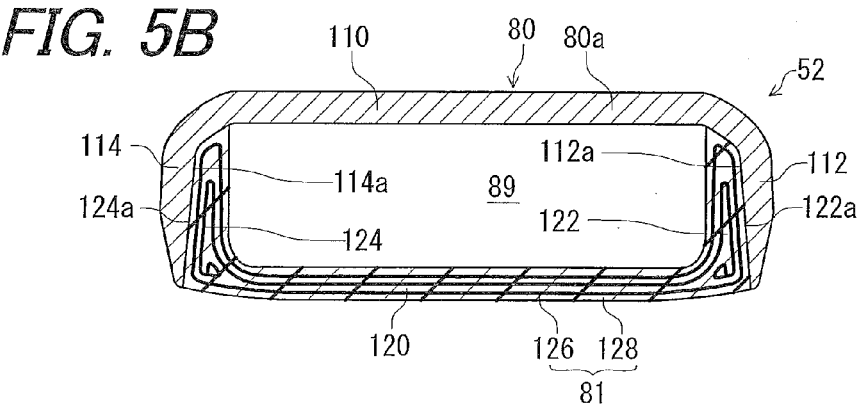
FIG. 5B is a schematic cross-sectional view of the left crank arms taken along line VB-VB of FIG. 2.
Figure 5C:
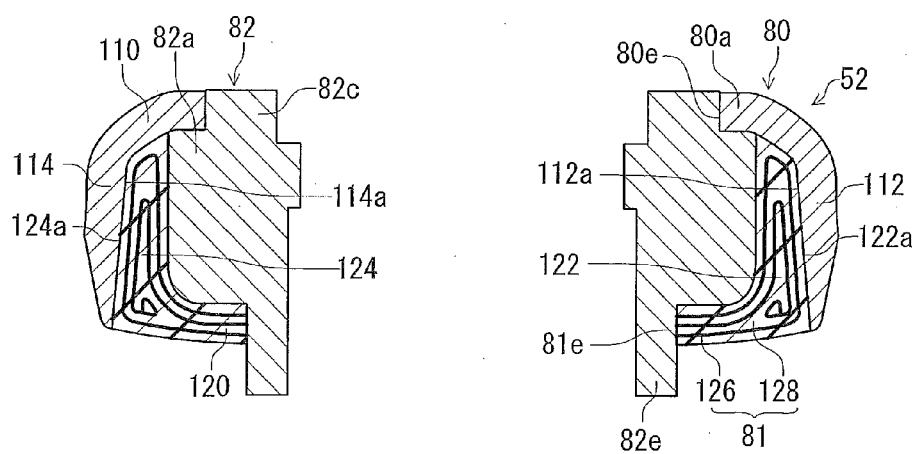
FIG. 5C is a schematic cross-sectional view of the left crank arms taken along line VC-VC of FIG. 2.

Referring now to FIGS. 5A to 5C, the first member 80 has a substantially U-shape in cross section in this embodiment. The first member 80 is made of aluminum and is formed by press working. The first member 80 includes a first base portion 110, a first side wall portion 112, and a second side wall portion 114. The first side wall portion 112 protrudes from a first end of the first base portion 110 and has a first inner surface 112a which directly contacts the non-metallic member 81. The second side wall portion 114 protrudes from a second end of the first base portion 110 and has a second inner surface 114a which directly contacts the non-metallic member 81. The first side wall portion 112 is spaced apart from the second side wall portion 114.

The non-metallic member 81 has a substantially U-shape in cross section in this embodiment as well as the first member 80. The non-metallic member 81 includes a second base portion 120, a third side wall portion 122, and a fourth side wall portion 124. The third side wall portion 122 protrudes from a first end of the second base portion 120 and has a first outer surface 122a directly attached to the first member 80. The fourth side wall portion 124 protrudes from a second end of the second base portion 120 and has a second outer surface 124a directly attached to the first member 80. The third side wall portion 122 is spaced apart from the fourth side wall portion 124.

As shown FIG. 5A, the second connecting member 83 is disposed between the third and fourth side wall portions 122 and 124 of the non-metallic member 81. The third side wall portion 122 of the non-metallic member 81 is disposed between the first side wall portion 112 of the first member 80 and the second connecting member 83. The fourth side wall portion 124 of the non-metallic member 81 is disposed between the second side wall portion 114 of the first member 80 and the second connecting member 83. The second connecting member 83 directly contacts the second base portion 120, the third side wall portion 122, and the fourth side wall portion 124 of the non-metallic member 81.

As shown FIG. 5C, the first connecting member 82 is disposed between the third and fourth side wall portions 122 and 124 of the non-metallic member 81. The third side wall portion 122 of the non-metallic member 81 is disposed between the first side wall portion 112 of the first member 80 and the first connecting member 82. The fourth side wall portion 124 of the non-metallic member 81 is disposed between the second side wall portion 114 of the first member 80 and the first connecting member 82. The first connecting member 82 directly contacts the second base portion 120, the third side wall portion 122, and the fourth side wall portion 124 of the non-metallic member 81.

The non-metallic member 81 is formed by resin transfer molding. In the first embodiment, the non-metallic member 81 is formed by a vacuum-assisted-resin-transfer-molding process. Further, in the first embodiment, the non-metallic member 81 includes a second member 126 and a bonding member 128 as shown in FIGS. 5A to 5C. The second member 126 includes, and preferably is made of, non-metallic material, preferably a carbon fiber material. The bonding member 128 includes, and preferably is made of, resin such as thermosetting resin, preferably epoxy resin. The bonding member 128 is dispersed into the second member 126 as matrix resin.

As shown in FIG. 5B, the first member 80 and the second member 126 are configured to form an interior cavity 89 therebetween in a state where the first member 80 and the second member 126 are attached to each other. In the first embodiment, the first member 80 and the second member 126 are integrally bonded to each other while the non-metallic member 81 is formed by the vacuum-assisted-resin-transfer-molding process. The first outer surface 122a of the non-metallic member 81 directly contacts the first inner surface 112a of the first member 80, and the first inner surface 112a of the first member 80 is bonded to the first outer surface 122a of the non-metallic member 81 by the bonding member 128 which serves as matrix resin of the non-metallic member 81. Also, the second outer surface 124a of the non-metallic member 81 directly contacts the second inner surface 114a of the first member 80, and the second inner surface 114a of the first member 80 is bonded to the second outer surface 124a of the non-metallic member 81 by the bonding member 128 which serves as matrix resin of the non-metallic member 81. Namely, the bonding member 128 is configured to attach the first and second members 80, 126 to each other. In the first embodiment, each of the first and second connecting members 82 and 83 may be configured to be disposed within the interior cavity between the first and second members 80, 126 so as to prevent the first and second members 80, 126 from being separated from each other until completion of attaching the first and second members 80, 126 to each other.

Since the right crank arm 51 has a cross section substantially similar to a cross section of the left crank arm 52, the cross-sectional view of the right crank arm 51 and the explanation thereof will be omitted.

Referring now to FIGS. 6A to 9C, the method for manufacturing the left crank arm 52 in accordance with the first embodiment of the present invention will be described below. Since the method for manufacturing the right crank arm 51 is substantially the same as the method for manufacturing the left crank arm 52, the method described below can be applied to that of the right crank arm 51, and therefore the detail explanation of the method for manufacturing the right crank arm 51 will be omitted.

Figure 7A:
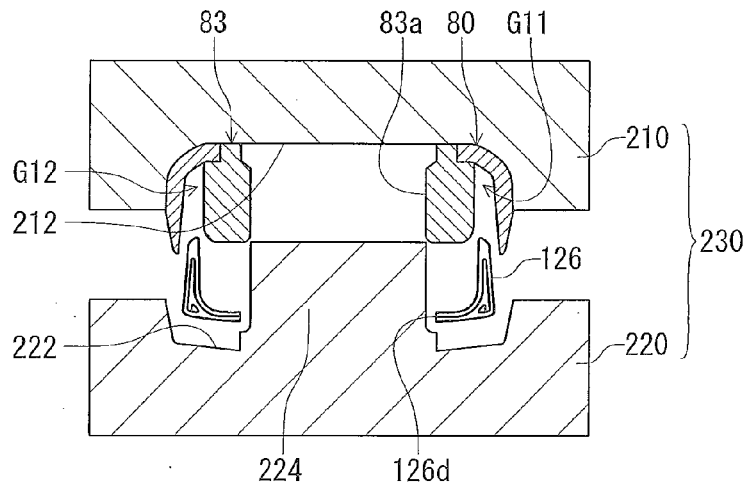
FIGS. 7A to 7C are schematic cross-sectional views of the left crank arm for explaining the method for manufacturing the left crank arm illustrated in FIG. 2.
Figure 7B:
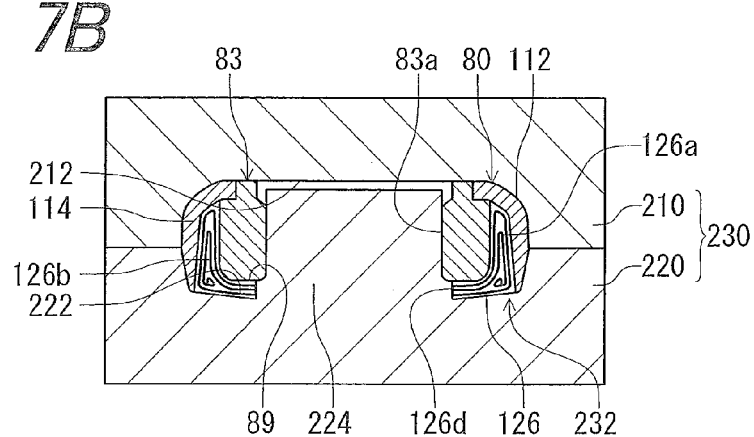
Figure 7C:
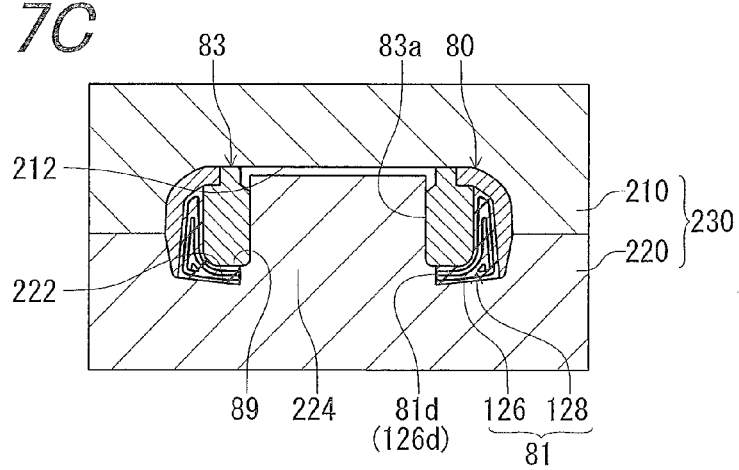
Figure 8A:
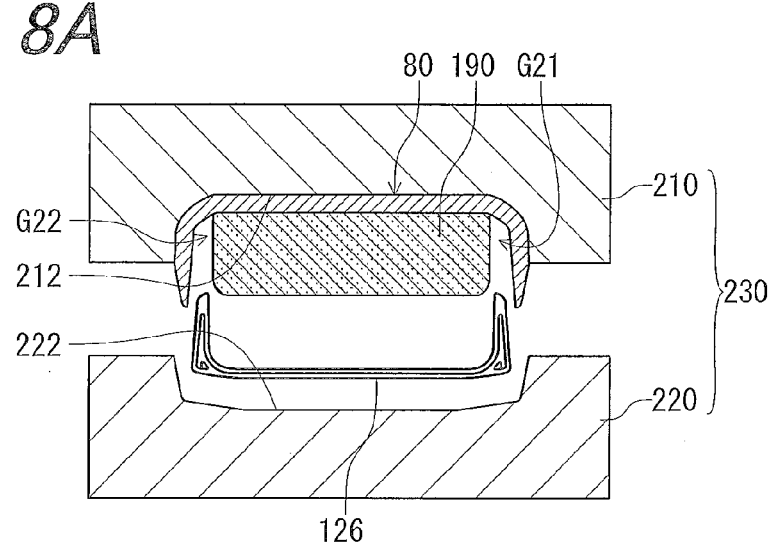
FIGS. 8A to 8C are schematic cross-sectional views of the left crank arm for explaining the method for manufacturing the left crank arm illustrated in FIG. 2.
Figure 8B:
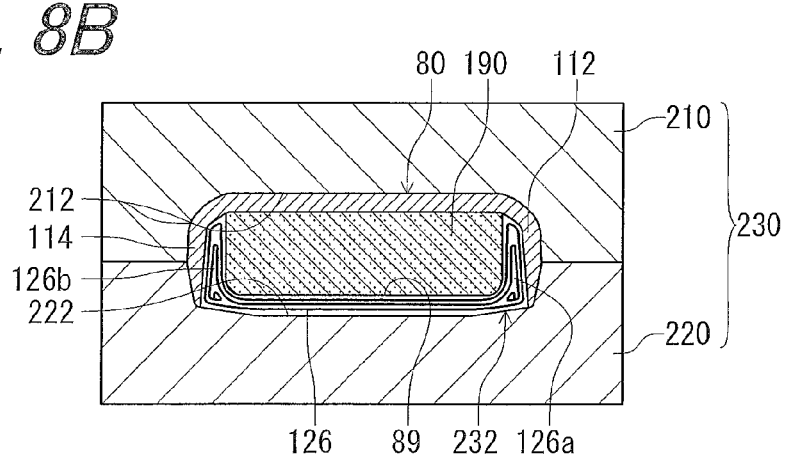
Figure 8C:
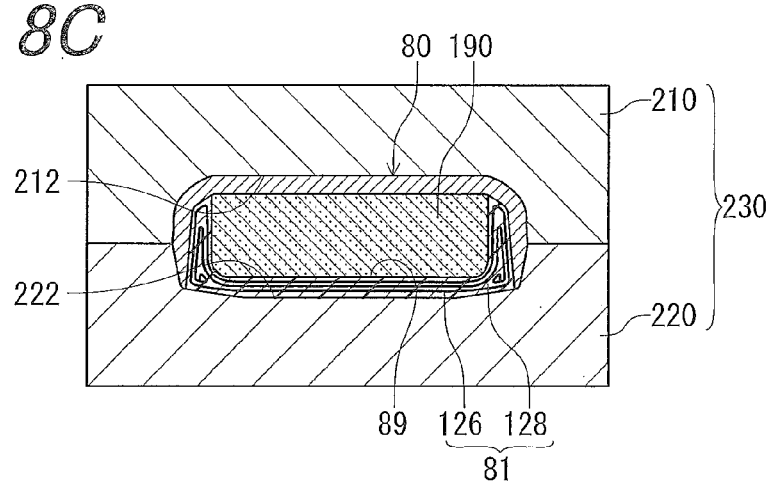
Figure 9A:
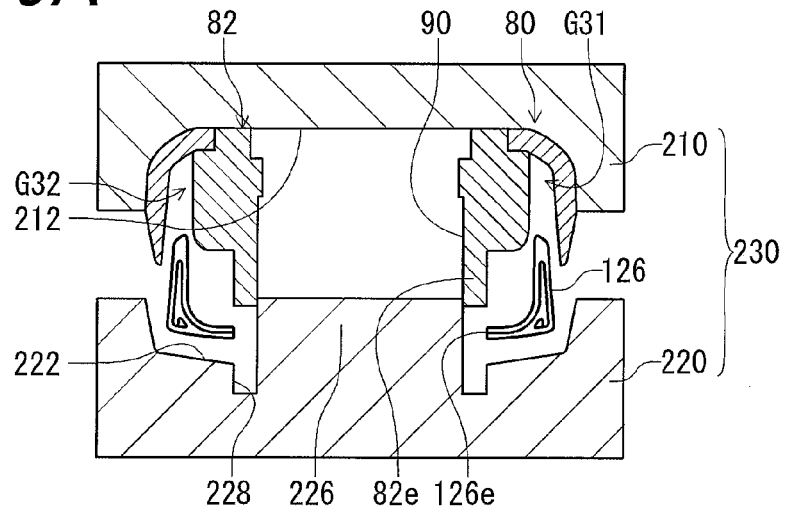
FIGS. 9A to 9C are schematic cross-sectional views of the left crank arm for explaining the method for manufacturing the left crank arm illustrated in FIG. 2.
Figure 9B:
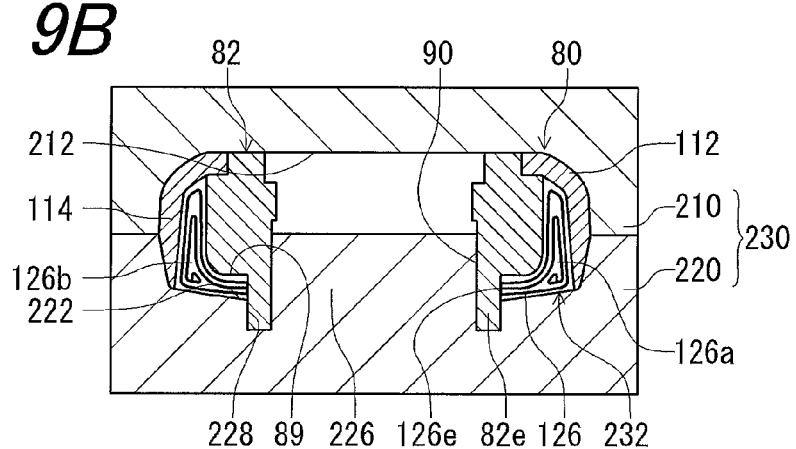
Figure 9C:
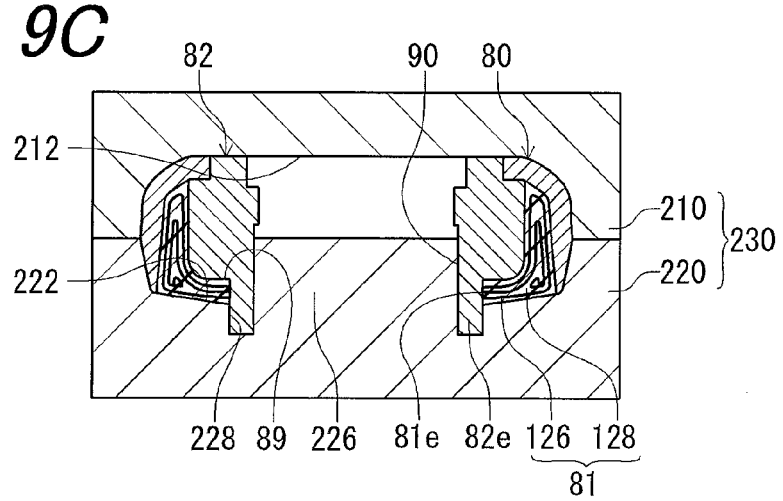

FIGS. 7A to 7C are schematic cross-sectional views of the left crank arm 52 for explaining the method for manufacturing the left crank arm 52 and correspond to FIG. 5A. FIGS. 8A to 8C are schematic cross-sectional views of the left crank arm 52 for explaining the method for manufacturing the left crank arm 52 and correspond to FIG. 5B. FIGS. 9A to 9C are schematic cross-sectional views of the left crank arm 52 for explaining the method for manufacturing the left crank arm 52 and correspond to FIG. 5C.

Figure 6A:
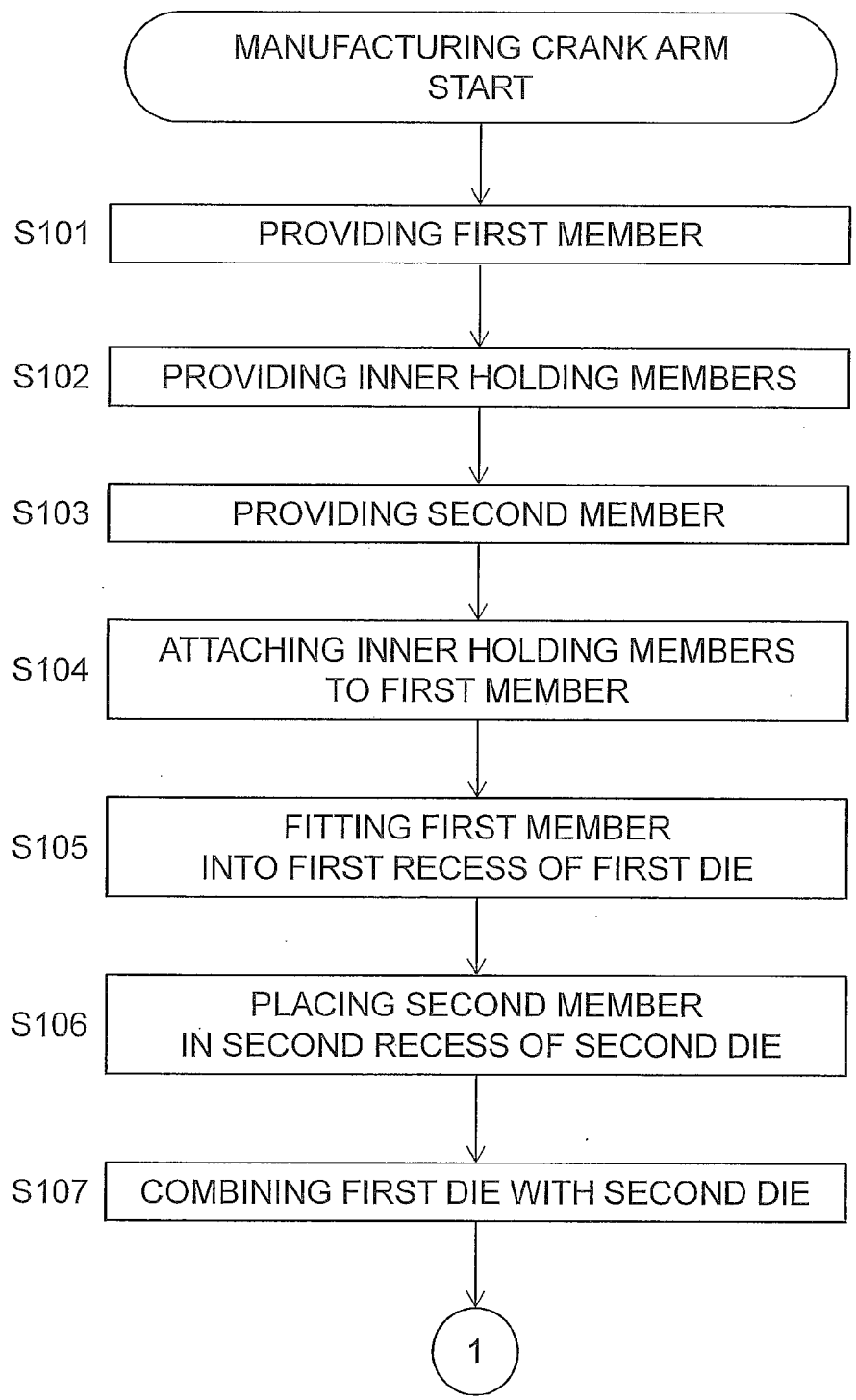
FIGS. 6A and 6B are flow charts of a method for manufacturing the bicycle crank arm in accordance with the first embodiment of the present invention.

As shown in FIG. 6A, in the step S101, the first member 80 is provided. More specifically, the aluminum material is cut into a desired size. The cut aluminum material is processed by cold forging to form the first member 80 prior to the step S101.

Figure 10:
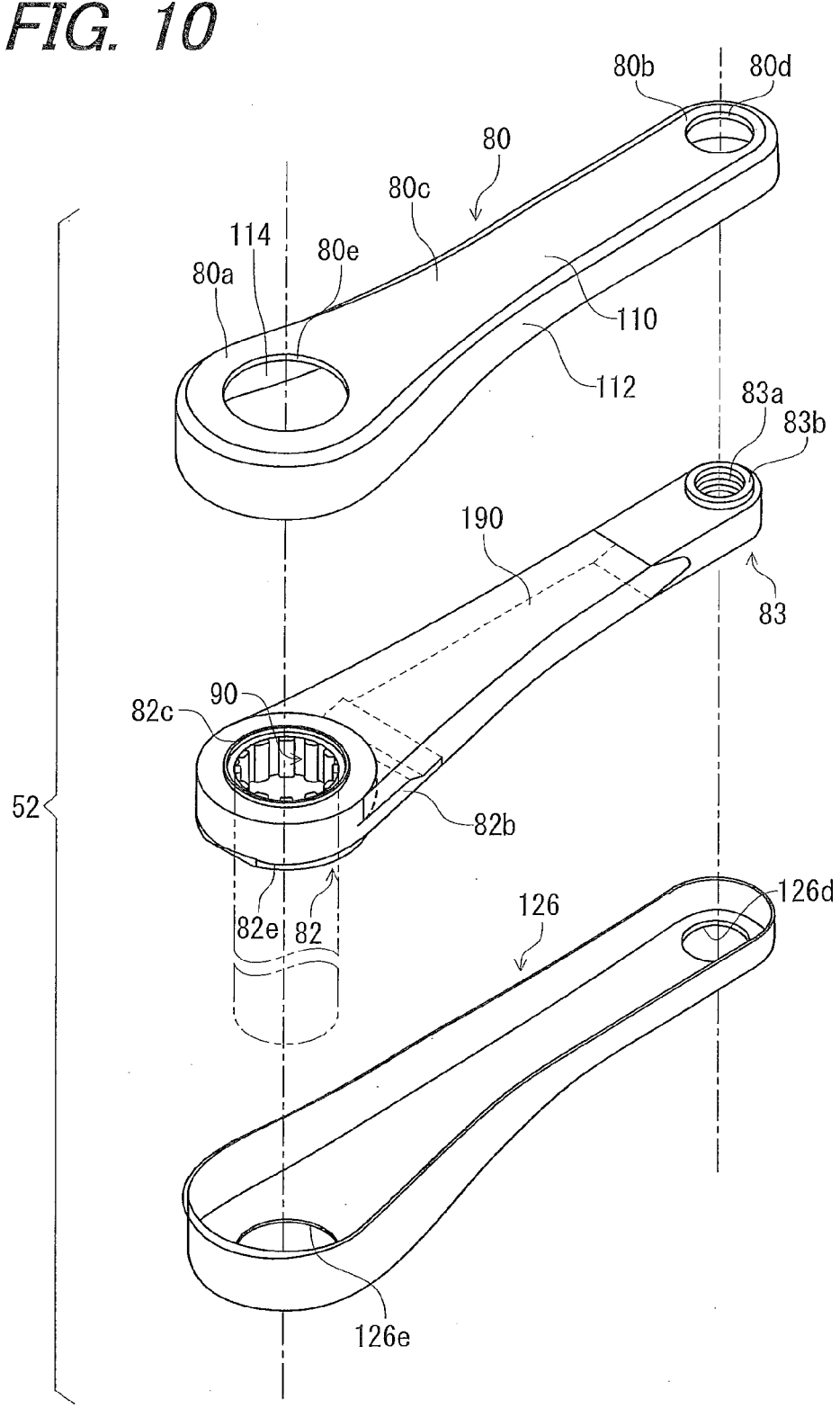
FIG. 10 is an exploded perspective view of the left crank arm for explaining the method for manufacturing the left crank arm illustrated in FIG. 2.

In step S102, the first and second connecting members 82 and 83 and an inner holding member 190 (FIGS. 8A to 8C and FIG. 10) are provided. More specifically, the first and second connecting members 82 and 83 are formed from the aluminum alloy material by cold forging or by machining, for example. The inner holding member 190 shown in FIGS. 8A to 8C is configured to be soluble in liquid. The inner holding member 190 is preferably made of a water soluble material such as water-soluble clay or polyvinyl alcohol. As shown in FIG. 10, the inner holding member 190 is formed into a shape corresponding to an intermediate space between the first and second connecting members 82 and 83 in the interior cavity 89. As shown in FIGS. 8A to 8C, the inner holding member 190 is configured to be disposed within the interior cavity 89 so as to prevent the first and second members 80 and 126 from being separated from each other until completion of attaching the first and second members 80, 126 to each other. If the inner holding member 190 is provided to prevent the first and second members 80, 126 from being separated from each other until completion of attaching the first and second members 80 and 126, the first and second connecting members 82 and 83 can be designed not to function so as to prevent the first and second members 80, 126 from being separated from each other until completion of attaching the first and second members 80 and 126.

In the step S103 of FIG. 6A, the second member 126 is provided as fiber material of fiber reinforced plastic. More specifically, a carbon fiber sheet is cut into a desired shape corresponding to the non-metallic member 81. The carbon fiber sheet which has been cut into the desired shape is three-dimensionally preformed into a shape substantially similar to the non-metallic member 81 in order to prepare the second member 126 of the non-metallic member 81 as a preform for the resin transfer molding.

In the step S104, the first and second connecting members 82 and 83 and the inner holding member 190 are provided to the first member 80 (FIGS. 7A, 8A and 9A). In a state where the first and second connecting members 82 and 83 and the inner holding member 190 are provided to the first member 80, the inner holding member 190 is disposed between the first and second connecting members 82 and 83. Furthermore, in a state where the first and second connecting members 82 and 83 and the inner holding member 190 are provided to the first member 80, gaps G11 and G12 are defined between the first member 80 and the second connecting member 83 (FIG. 7A), gaps G21 and G22 are defined between the first member 80 and the inner holding member 190 (FIG. 8A), and gaps G31 and G32 are defined between the first member 80 and the first connecting member 82 (FIG. 9A).

In the step S105, the first member 80 to which the first and second connecting members 82 and 83 and the inner holding member 190 have been provided is fitted into a first recess 212 of a first die 210 (FIGS. 7A, 8A and 9A).

In the step S106, the second member 126 is placed in a second recess 222 of a second die 220 (FIGS. 7A, 8A and 9A). As shown in FIGS. 7A, 8A and 9A, in the steps S104 to S106, the first and second connecting members 82 and 83 and the inner holding member 190 are provided between the first and second members 80 and 126 before fitting the first and second members 80 and 126 together.

The second die 220 includes a first protrusion 224 and a second protrusion 226. The first and second protrusions 224 and 226 are provided in the second recess 222. The first protrusion 224 is configured to be inserted into the second connecting hole 83a of the second connecting member 83 in the resin transfer molding (FIGS. 7A to 7C). The first protrusion 224 is inserted into a first through-hole 126d provided in the second member 126 when the second member 126 is placed in the second recess 222. The through-hole 81d of the non-metallic member 81 is formed from the first through-hole 126d through the resin transfer molding (FIG. 4).

The second protrusion 226 is configured to be inserted into the first connecting hole 90 of the first connecting member 80 in the resin transfer molding (FIGS. 9A to 9C). The second protrusion 226 is inserted into a second through-hole 126e provided in the second member 126 when the second member 126 is placed in the second recess 222. Furthermore, the second annular protrusion 82e is inserted into the second through-hole 126e when the first die 210 is combined with the second die 220 (FIG. 9C). The through-hole 81e of the non-metallic member 81 is formed from the second through-hole 126e through the resin transfer molding (FIG. 4).

As shown in FIG. 6A, in the step S107, the first die 210 is combined with the second die 220 to close the mold 230. When the first die 210 is combined with the second die 220, parts of the second member 126 are inserted into the gaps G11, G12, G21, G22, G31 and G32, and the first and second members 80, 126 are fitted together (FIGS. 7B, 8B and 9B). As shown in FIGS. 7B, 8B and 9B, the first and second members 80, 126 are configured to form the interior cavity 89 therebetween in a state where the first and second members 80 and 126 are attached to each other.

As shown in FIGS. 7A, 7B, 8A 8B, 9A, and 9B, the gaps G11, G12, G21, G22, G31 and G32 are included in a mold cavity 232 to form the non-metallic member 81. As shown in FIGS. 7B, 8B, and 9B, the mold cavity 232 has substantially the same shape as the shape of the non-metallic member 81. The mold cavity 232 is defined by the first member 80, the first connecting member 82, the second connecting member 83, the inner holding member 190, and the second die 220. The second member 126 is provided in the mold cavity 232 as carbon fiber material of the non-metallic member 81. The second member 126 is supported by the first and second connecting members 82 and 83 and the inner holding member 190 to be disposed at a desired position.

As shown in FIG. 7B, the second connecting member 83 is disposed within the interior cavity 89 so as to prevent the first and second members 80, 126 from being separated from each other until completion of attaching the first and second members 80, 126 to each other. More specifically, the second connecting member 83 is disposed within the interior cavity 89 so as to prevent first and second side wall portions 126a and 126b of the second member 126 from being separated from the first and second side wall portions 112 and 114 of the first member 80.

As shown in FIG. 8B, the inner holding member 190 is disposed within the interior cavity 89 so as to prevent the first and second members 80, 126 from being separated from each other until completion of attaching the first and second members 80 and 126 to each other. More specifically, the inner holding member 190 is disposed within the interior cavity 89 so as to prevent the first and second side wall portions 126a and 126b of the second member 126 from being separated from the first and second side wall portions 112 and 114 of the first member 80.

As shown in FIG. 9B, the first connecting member 82 is disposed within the interior cavity 89 so as to prevent the first and second members 80 and 126 from being separated from each other until completion of attaching the first and second members 80 and 126 to each other. More specifically, the first connecting member 82 is disposed within the interior cavity 89 so as to prevent the first and second side wall portions 126a and 126b of the second member 126 from being separated from the first and second side wall portions 112 and 114 of the first member 80.

Figure 6B:
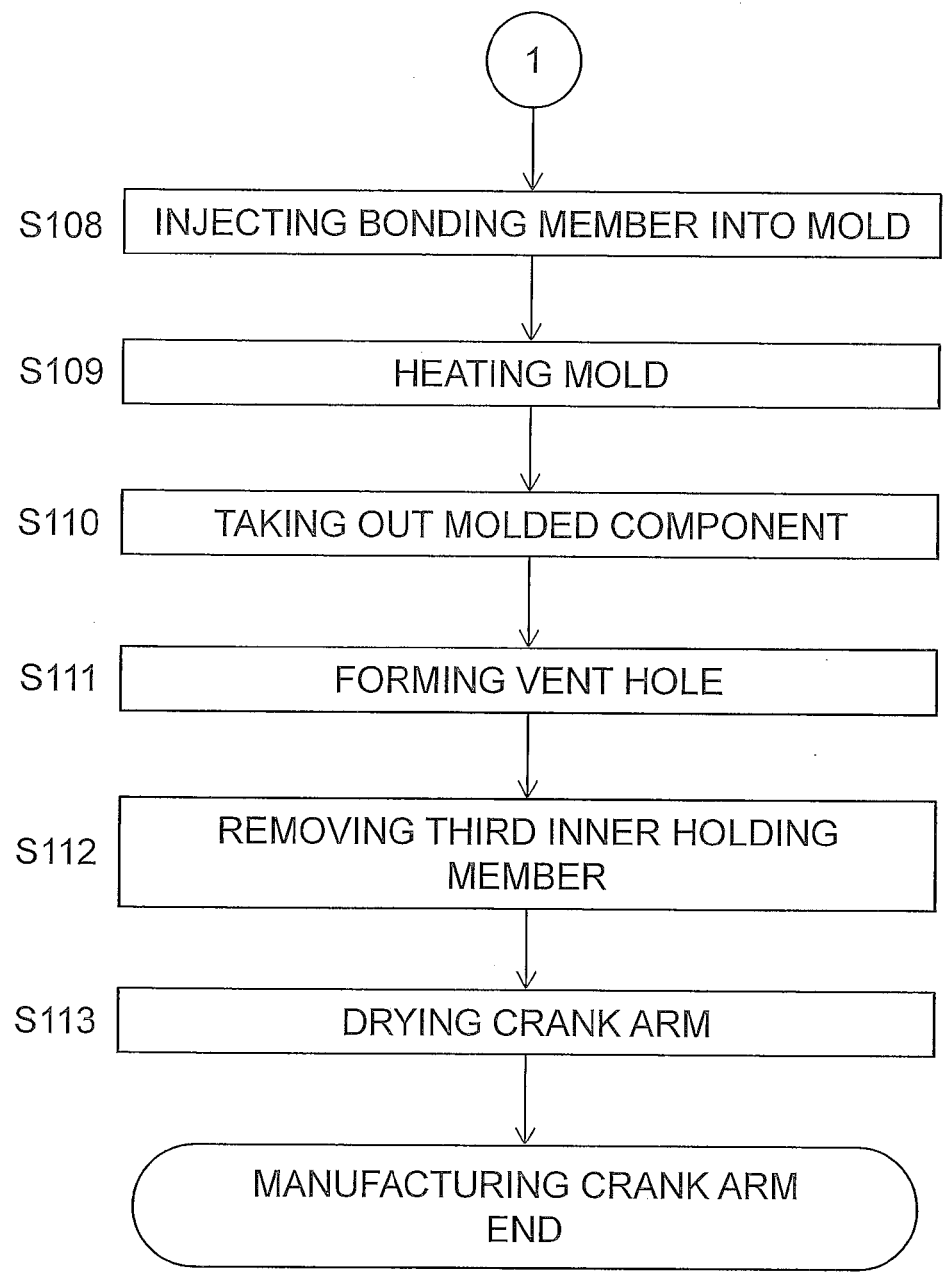

Referring now to FIG. 6B, in the step S108, the bonding member 128 is provided to the second member 126 in a vacuum-assisted-resin-transfer-molding process after fitting the first and second members 80 and 126 together. More specifically, the bonding member 128 which is epoxy resin in a liquid state is injected into the mold cavity 232 in a state where the mold cavity 232 is in a vacuum. The bonding member 128 flows into the mold cavity 232, and the mold cavity 232 is filled with the bonding member 128. The bonding member 128 is dispersed around and into the second member 126, and the second member 126 is impregnated with the bonding member 128 (FIGS. 7C, 8C and 9C).

In the step S109, the mold 230 is heated to cure the bonding member 128 made of the thermosetting resin. While the bonding member 128 gradually cures in the mold cavity 232, the first member 80 and the non-metallic member 81 are gradually bonded to each other by adhesibility of the bonding member 128 contained in the non-metallic member 81. More specifically, the third and fourth side wall portions 122 and 124 of the non-metallic member 81 are gradually bonded to the first and second side wall portions 112 and 114 of the first member 80 by adhesibility of the bonding member 128 contained in the non-metallic member 81 while the resin gradually cures in the mold cavity 232 (FIGS. 7C, 8C, and 9C). As a result, the first member 80 and the second member 126 are attached to each other through the bonding member 128 by the integral molding process. In such a manufacturing process according to the invention, a composite bicycle component such as the above-mentioned crank arm can be manufactured without using adhesive. Accordingly, it is possible to omit a step to apply adhesive to a bicycle component, and thereby it is possible to reduce manufacturing time.

In the step S110, the first die 210 is separated from the second die 220 to open the mold 230 after completion of injecting the bonding member 128. The molded component (the first member 80 and the non-metallic member 81) with the inner holding member 190 is taken out from the second die 220. The first member 80 and the non-metallic member 81 are integrally bonded to each other because of the adhesibility of the bonding member 128 contained in the non-metallic member 81.

In the step S111, the through-hole 84a (FIG. 4) is formed by machining, for example. It should be understood that the through-hole 84a can be formed on the second member 126 before the resin transfer molding as well as the first and second through-holes 126d and 126e, which allows the step S111 to be omitted.

In the step S112, the inner holding member 190 made of the water soluble material is removed from the interior cavity 89 of the non-metallic member 81. More specifically, water is injected via the through-hole 84a into the interior cavity 89. Since the inner holding member 190 is made of the water soluble material in the first embodiment, the inner holding member 190 is gradually soluble in water injected into the interior cavity 89. The inner holding member 190 which has been soluble in water can gradually flow out with water via the through-hole 84a from the interior cavity 89, which allows the inner holding member 190 to be removed from the interior cavity 89.

In the step S113, the first member 80 and the non-metallic member 81 are dried to complete the manufacturing of the left crank arm 52 after the inner holding member 190 has been removed from the interior cavity 89.

The method for manufacturing the crank arm discussed above is merely one example of the method according to the first embodiment. Thus, it will be apparent to those skilled in the art from this disclosure that the steps S101 to S113 could be performed in alternate orders in order to achieve the crank arm of the embodiment as needed and/or desired. Moreover, it will be apparent to those skilled in the art from this disclosure that parts (i.e., sub-steps) of the steps S101 to S113 could be performed in alternate or interlaced orders in order to achieve the crank arm of the embodiment as needed and/or desired, without departing from the scope of the present invention.

Since the non-metallic member 81 is made of the carbon fiber reinforced plastic, it is possible to save weight of the left crank arm 52 comparing with both shell members of a crank arm are made of metallic material while obtaining necessary rigidity of the left crank arm 52.

Second Embodiment

The right and left crank arms 251 and 252 in accordance with a second embodiment of the present invention will be described below referring to FIGS. 11-14C. Elements having substantially the same function as those in the first embodiment will be numbered the same here, and will not be described again in detail.

Figure 11:
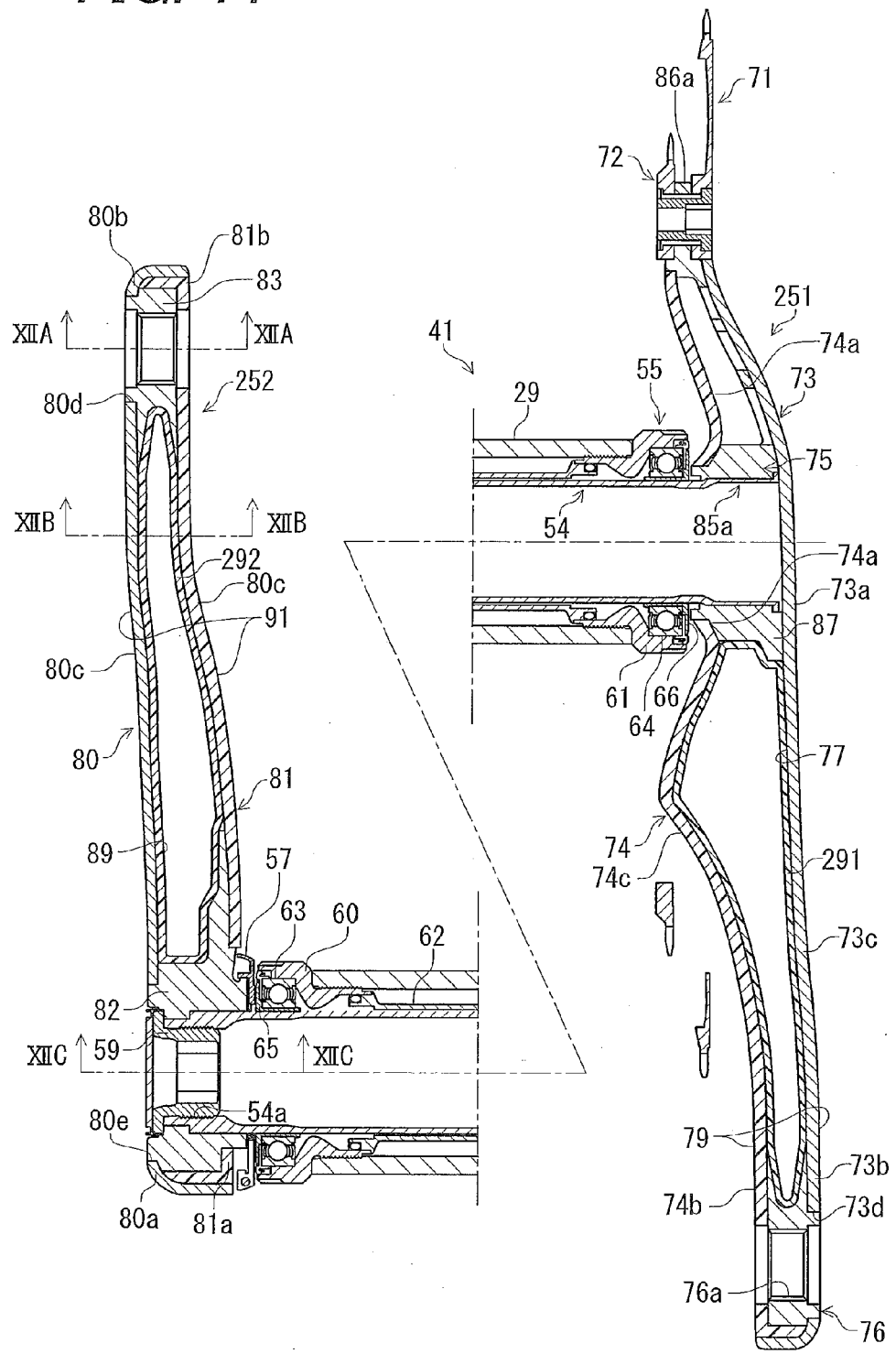
FIG. 11 is a transverse cross sectional view of a bicycle crank axle assembly with bicycle crank arms in accordance with a second embodiment of the present invention.

Referring now to FIG. 11, the right crank arm 251 includes an inner holding member 291 provided in the interior cavity 77, and the left crank arm 252 includes an inner holding member 292 provided in the interior cavity 89. The inner holding member 291 is provided between the first connecting member 75 and the second connecting member 76 in the interior cavity 77. The inner holding member 292 is provided between the first connecting member 82 and the second connecting member 83 in the interior cavity 89. The inner holding members 291 and 292 are hollow deformable members such as inflated bags made of resin. More specifically, the inner holding members 291 and 292 preferably include inflatable bags made of resin such as polyethylene, for example. It should be understood that the inner holding members 291 and 292 can be made of other light materials such as foam polystyrene.

The inner holding members 291 and 292 are inflated with air, for example, and are deformable in accordance with the shape of the interior cavities 77 and 89. The inner holding members 291 and 292 are used to support the second member 126 in the method for manufacturing the right and left crank arms 251 and 252. The inner holding members 291 and 292 can naturally deflate in the interior cavities 77 and 89 after manufacturing the right and left crank arms 251 and 252. The inner holding member 291 may be attached to the first member 73 by an adhesive. The inner holding member 292 may be attached to the first member 80 by an adhesive.

Figure 12A:
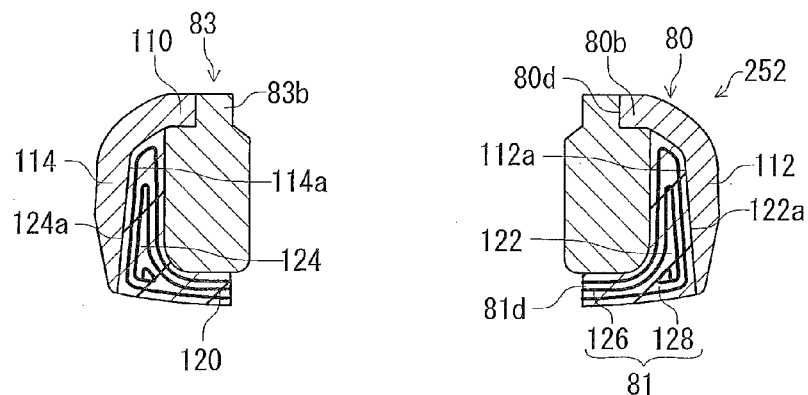
FIG. 12A is a schematic cross-sectional view of the left crank arm taken along line XIIA-XIIA of FIG. 11.
Figure 12B:
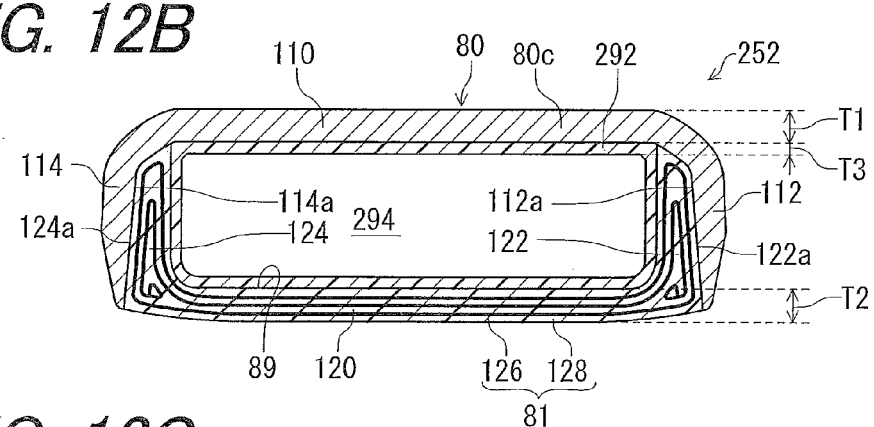
FIG. 12B is a schematic cross-sectional view of the left crank arm taken along line XIIB-XIIB of FIG. 11.
Figure 12C:
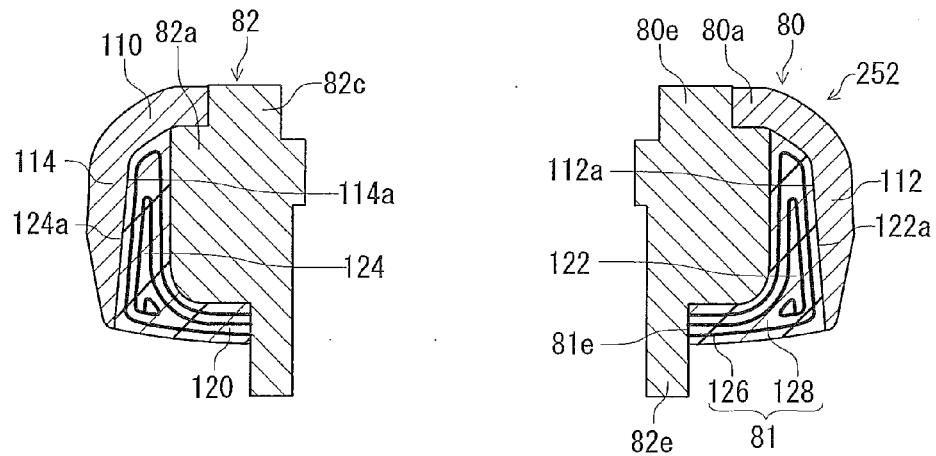
FIG. 12C is a schematic cross-sectional view of the left crank arm taken along line XIIC-XIIC of FIG. 11.

As shown in FIG. 12B, the inner holding member 292 includes an inner space 294 filled with air, for example. It should be understood that the inner holding member 292 is filled with gases other than air. The thickness T3 of the inner holding member 292 is substantially constant. The thickness T3 is smaller than the thickness T1 of the first member 80 and the thickness T2 of the non-metallic member 81. The inner holding member 292 is configured to be disposed in the interior cavity 89 so as to prevent the third and fourth side wall portions 122 and 124 of the non-metallic member 81 from being separated from the first and second side wall portions 112 and 114 of the first member 80.

Figure 13:
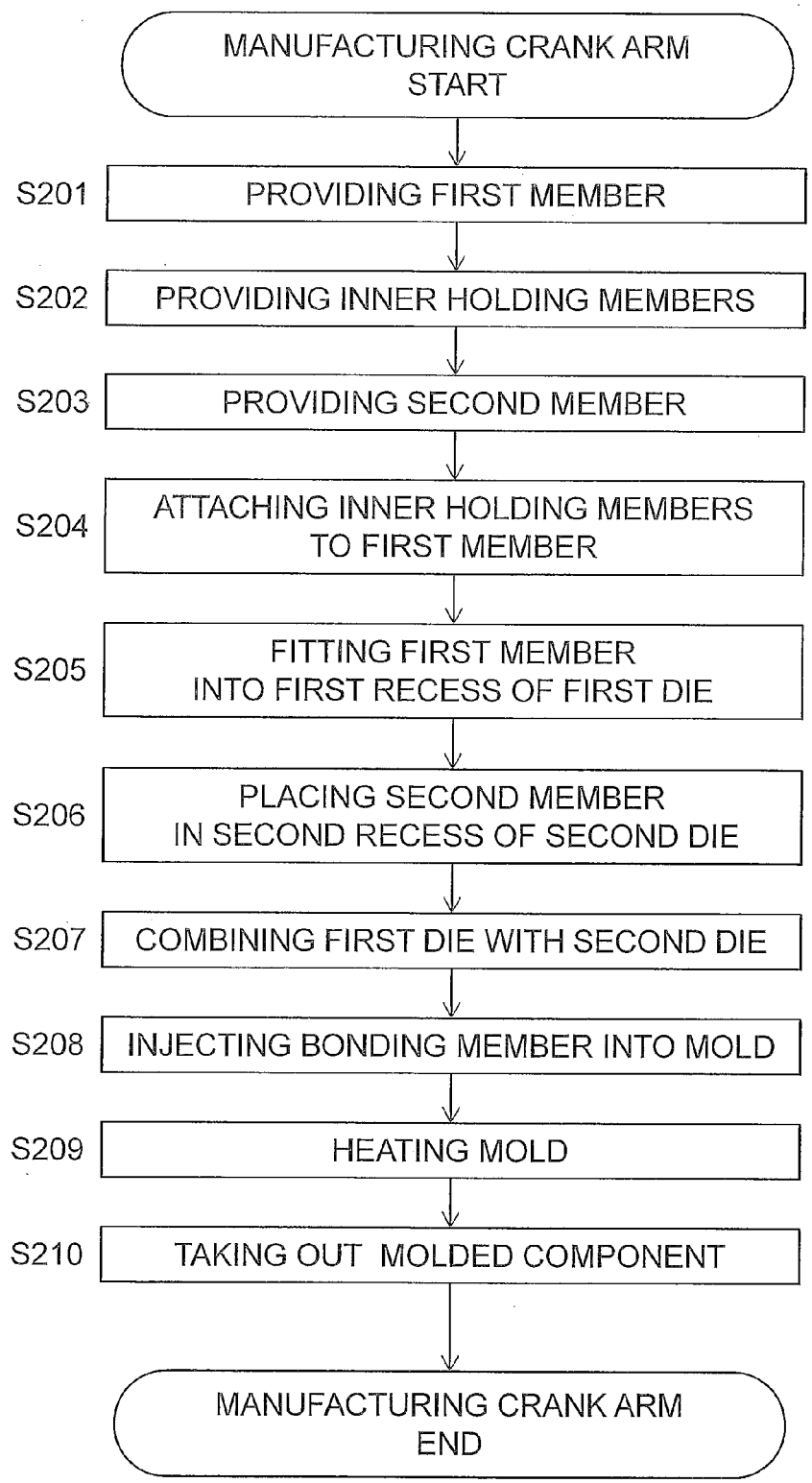
FIG. 13 is a flow chart of a method for manufacturing the bicycle crank arm in accordance with the second embodiment of the present invention.

Referring now to FIG. 13, the method for manufacturing the left crank arm 252 in accordance with the second embodiment of the present invention will be described below. Since the method for manufacturing the right crank arm 251 is substantially the same as the method for manufacturing the left crank arm 252, the method described below can be applied to that of the right crank arm 251, and therefore the detail explanation of the method for manufacturing the right crank arm 251 will be omitted.

As shown in FIG. 13, in the step S201, the first member 80 is provided. More specifically, the aluminum sheet is cut into a desired size and is processed by cold forging to form the first member 80.

In step S202, the first and second connecting members 82 and 83 and the inner holding member 292 are provided. More specifically, the first and second connecting members 82 and 83 are formed from the aluminum alloy material by cold forging or by machining, for example. To provide the inner holding member 292 which is the inflatable bag made of polyethylene, a bag having a thin thickness is inflated with air, and an inlet of the bag is sealed.

As shown in FIG. 12B, the inner holding member 292 is inflated with air from an inlet (not shown) thereof, and the inlet is sealed in a state where the bag is inflated. The inner holding member 292 has a thin thickness (T3) to be deformable. The inner holding member 292 is configured to be disposed within the interior cavity 89 so as to prevent the first and second members 80 and 126 from being separated from each other in the resin transfer molding.

In the step S203, the second member 126 is provided. More specifically, a carbon fiber sheet is cut into a desired shape corresponding to the non-metallic member 81. The carbon fiber sheet which has been cut into the desired shape is three-dimensionally preformed into a shape substantially similar to the non-metallic member 81 in order to prepare the second member 126 of the non-metallic member 81 as a preform for the resin transfer molding.

Figure 14A:
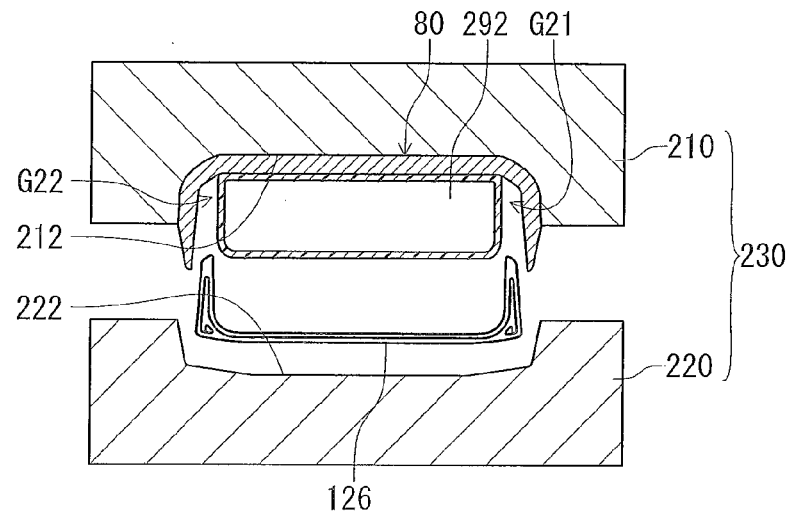
FIGS. 14A to 14C are schematic cross-sectional views of the left crank arm for explaining the method for manufacturing the left crank arm illustrated in FIG. 11.

In the step S204, the first and second connecting members 82 and 83 and the inner holding member 292 are provided to the first member 80 (FIG. 14A). In a state where the first and second connecting members 82 and 83 and the inner holding member 292 are provided to the first member 80, the inner holding member 292 is disposed between the first and second connecting members 82 and 83 (FIG. 11). Furthermore, in a state where the first and second connecting members 82 and 83 and the inner holding member 292 are provided to the first member 80, gaps G11 and G12 are defined between the first member 80 and the second connecting member 83, gaps G21 and G22 are defined between the first member 80 and the inner holding member 292 (FIG. 14A), and gaps G31 and G32 are defined between the first member 80 and the first connecting member 82, as well as the first embodiment.

In the step S205, the first member 80 to which the first and second connecting members 82 and 83 and the inner holding member 292 have been provided is fitted into the first recess 212 of the first die 210 (FIG. 14A).

In the step S206, the second member 126 is placed in the second recess 222 of the second die 220 (FIG. 14A). As shown in FIG. 14A, in the steps S204 to S206, the first and second connecting members 82 and 83 and the inner holding member 292 are provided between the first and second members 80 and 126 before fitting the first and second members 80 and 126 together, as well as the first embodiment.

In the step S207, the first die 210 is combined with the second die 220 to close the mold 230. When the first die 210 is combined with the second die 220, parts of the second member 126 are inserted into the gaps G11, G12, G21, G22, G31 and G32, and the first and second members 80, 126 are fitted together (FIG. 14B).

Figure 14B:
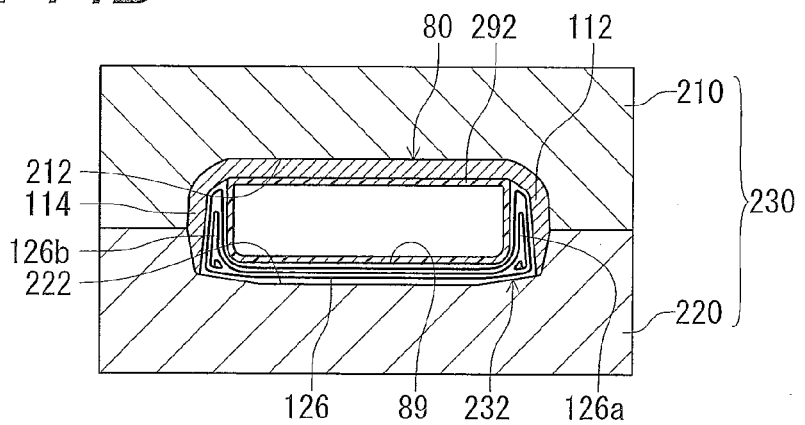

As shown in FIG. 14B, the first and second members 80 and 126 are configured to form the interior cavity 89 therebetween in a state where the first and second members 80 and 126 are attached to each other. The inner holding member 292 is disposed within the interior cavity 89 so as to prevent the first and second members 80, 126 from being separated from each other until completion of attaching the first and second members 80, 126. More specifically, the inner holding member 292 is disposed within the interior cavity 89 so as to prevent the first and second side wall portions 126a and 126b of the second member 126 from being separated from the first and second side wall portions 112 and 114 of the first member 80.

Figure 14C:
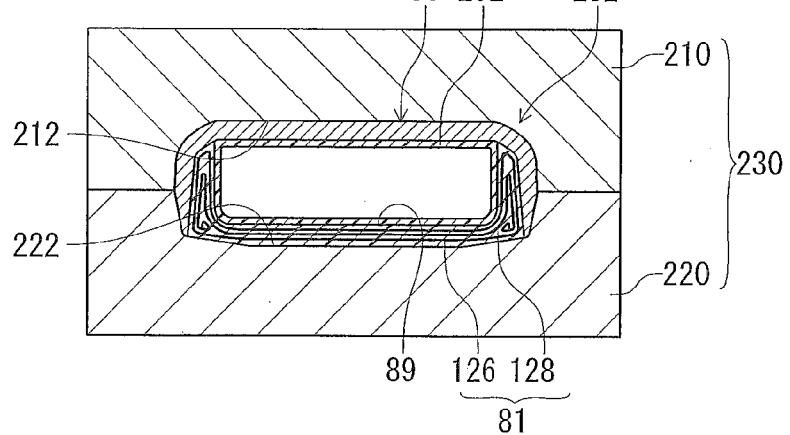

As shown in FIG. 13, in the step S208, the bonding member 128 is provided to the second member 126 in a vacuumassisted-resin-transfer-molding process after fitting the first and second members 80, 126 together. More specifically, the bonding member 128 which is in a liquid state is injected into the mold cavity 232 in a state where the mold cavity 232 is in a vacuum. The bonding member 128 flows in the mold cavity 232, and the mold cavity 232 is filled with the bonding member 128. The bonding member 128 is dispersed around and into the second member 126, and the second member 126 is impregnated with the bonding member 128 (FIG. 14C).

In the step S209, the mold 230 is heated to cure the bonding member 128 made of the thermosetting resin. As well as the first embodiment, the bonding member 128 is configured to attach the first and second members 80, 126 to each other. While the bonding member 128 gradually cures in the mold cavity 232, the first member 80 and the non-metallic member 81 are gradually bonded to each other by adhesibility of the bonding member 128 contained in the non-metallic member 81. More specifically, the third and fourth side wall portions 122 and 124 of the non-metallic member 81 are gradually bonded to the first and second side wall portions 112 and 114 of the first member 80 by adhesibility of the bonding member 128 contained in the non-metallic member 81 while the resin gradually cures in the mold cavity 232 (FIG. 14C). As a result, the first member 80 and the second member 126 are attached to each other through the bonding member 128 by the integral molding process.

Furthermore, air in the inner holding member 292 is expanded because of heat applied to the mold 230, and the inner holding member 292 inflates in a range in which the inner holding member 292 is deformable. Therefore, the inner holding member 292 can prevent the first and second side wall portions 126a and 126b (the third and fourth side wall portions 122 and 124) of the second member 126 from being separated from the first and second side wall portions 112 and 114 of the first member 80 during the resin transfer molding, which allows the third and fourth side wall portions 122 and 124 of the second member 126 to be firmly bonded to the first and second side wall portions 112 and 114 of the first member 80.

In the step S210, the first die 210 is removed from the second die 220 to open the mold 230 after the predetermined time period has been elapsed from completion of injecting the resin. The first member 80 and the non-metallic member 81 with the inner holding member 292 are taken out from the second die 220. The first member 80 and the non-metallic member 81 are integrally secured to each other because of the adhesibility of the bonding member 128 contained in the non-metallic member 81.

It should be understood that, in the above method according to the second embodiment, the steps S111 to S113 of the first embodiment can be omitted. For example, the inner holding member 292 is not removed from the interior cavity 89 of the non-metallic member 81 because of lightweight thereof. The through-hole 84a (FIG. 4) is not necessary in the second embodiment; however, the through-hole 84a can be formed as well as the first embodiment for the other purposes.

The method for manufacturing the crank arm discussed above is merely one example of the method according to the second embodiment. Thus, it will be apparent to those skilled in the art from this disclosure that the steps S201 to S210 could be performed in alternate orders in order to achieve the crank arm of the embodiment as needed and/or desired. Moreover, it will be apparent to those skilled in the art from this disclosure that parts (i.e., sub-steps) of the steps S201 to S210 could be performed in alternate or interlaced orders in order to achieve the crank arm of the embodiment as needed and/or desired, without departing from the scope of the present invention.

Since the non-metallic member 81 is made of the carbon fiber reinforced plastic, it is possible to save weight of the left crank arm 252 comparing with both shell members of a crank arm are made of metallic material while obtaining necessary rigidity of the left crank arm 252.

Third Embodiment

The right and left crank arms 351 and 352 in accordance with a third embodiment of the present invention will be described below referring to FIGS. 15 to 16C. Elements having substantially the same function as those in the first and second embodiments will be numbered the same here, and will not be described again in detail.

Figure 15:
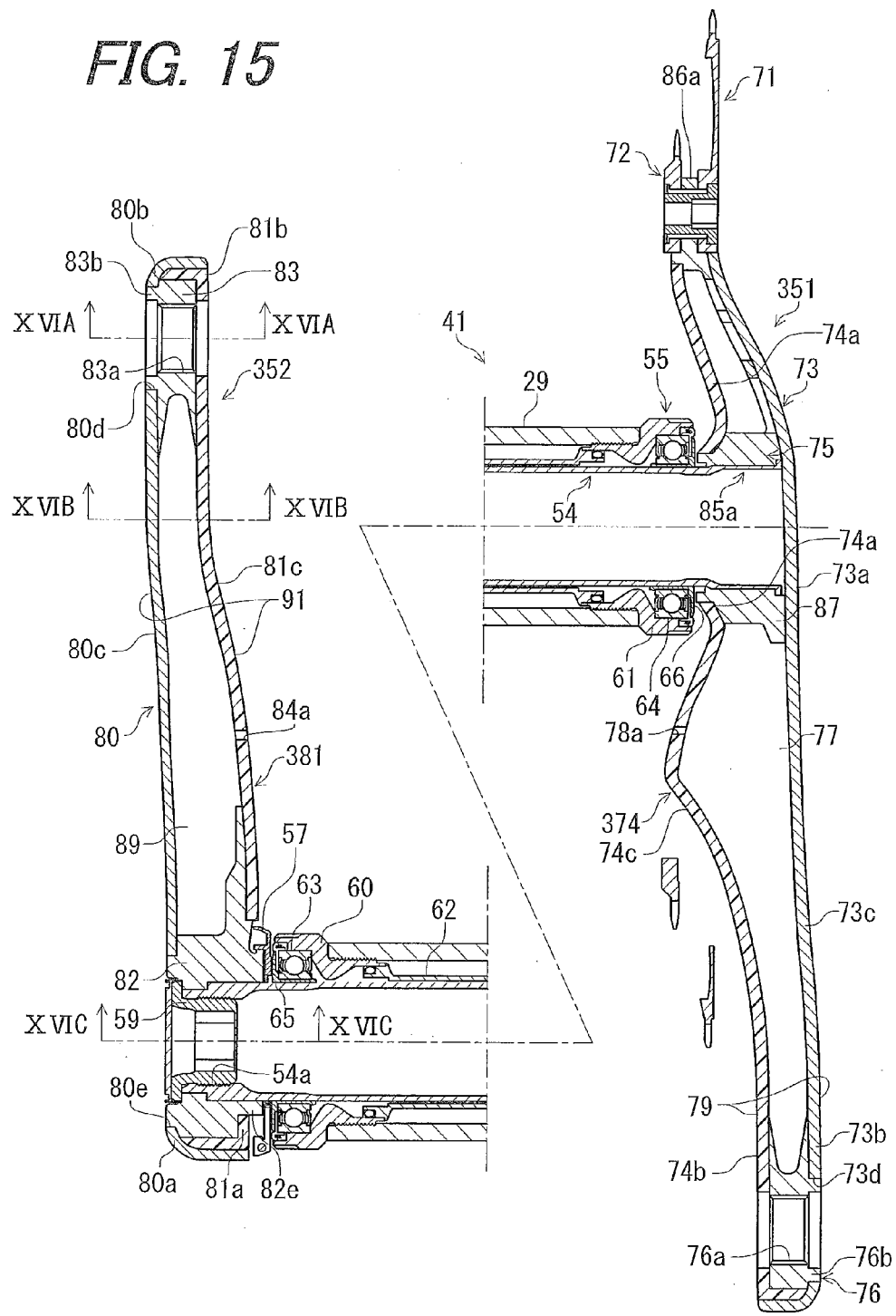
FIG. 15 is a transverse cross sectional view of a bicycle crank axle assembly with bicycle crank arms in accordance with a third embodiment of the present invention.

As shown in FIG. 15, the right crank arm 351 includes the first member 73, a second member 374, the first connecting member 75, and the second connecting member 76. The second member 374 is substantially the same as the non-metallic member 74 according to the first and second embodiment and is made of fiber reinforced plastic, preferably carbon fiber reinforced plastic. The left crank arm 352 includes the first member 80, a second member 381, the first connecting member 82, and the second connecting member 83. The second member 381 is substantially the same as the non-metallic member 81 according to the first and second embodiments and is made of fiber reinforced plastic, preferably carbon fiber reinforced plastic. Unlike the first and second embodiments, the first and second members 73 and 374 are bonded to each other by a bonding member made of an adhesive, and the first and second members 80 and 381 are bonded to each other by a bonding member made of an adhesive.

Figure 16A:
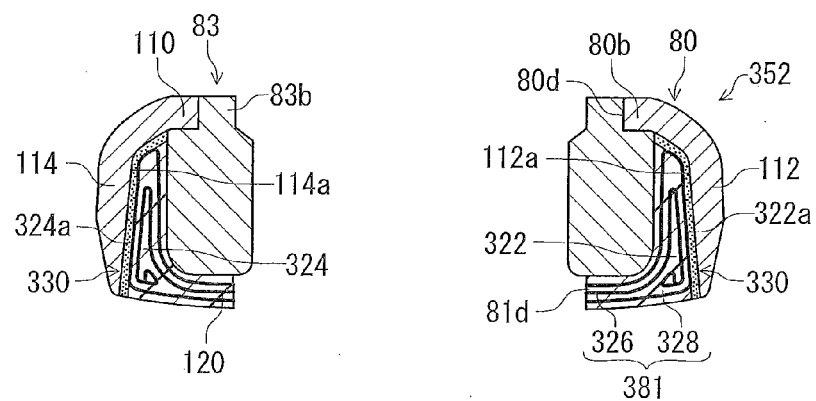
FIG. 16A is a schematic cross-sectional view of the left crank arm taken along line XVIA-XVIA of FIG. 15.
Figure 16B:
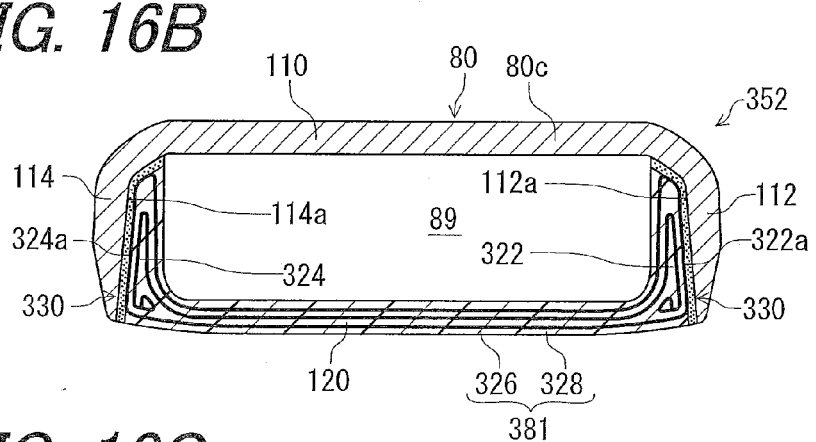
FIG. 16B is a schematic cross-sectional view of the left crank arm taken along line XVIB-XVIB of FIG. 15.
Figure 16C:
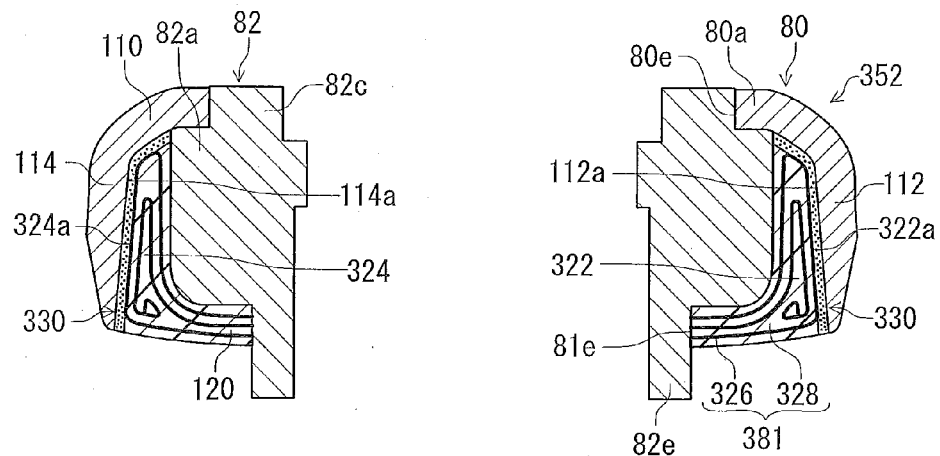
FIG. 16C is a schematic cross-sectional view of the left crank arm taken along line XVIC-XVIC of FIG. 15.

As shown in FIGS. 16A-16C, the second member 381 of the left crank arm 352 is preferably made of carbon-fiber reinforced plastic containing non-metallic fiber material 326 and matrix resin 328. The non-metallic fiber material 326 is preferably carbon fiber material, for example. The matrix resin 328 is thermosetting resin, preferably epoxy resin. Accordingly, the second member 381 according to the third embodiment is different from the second member 126 according to the first and second embodiments in that the second member 381 of the third embodiment includes the matrix resin 328 whereas the second member 126 of the first and second embodiments does not include such a matrix resin. The first and second members 80 and 381 are configured to form the interior cavity 89 therebetween in a state where the first and second members 80 and 381 are attached to each other via a bonding member 330.

The bonding member 330 is configured to attach the first and second members 80 and 381 to each other. The bonding member 330 preferably includes an adhesive to attach the first and second members 80 and 381 to each other, for example. More specifically, the second member 381 includes a second base portion 320, a third side wall portion 322, and a fourth side wall portion 324. The third side wall portion 322 protrudes from a first end of the second base portion 320 and includes a first outer surface 322a. The fourth side wall portion 324 protrudes from a second end of the second base portion 320 and includes a second outer surface 324a. The first side wall portion 112 of the first member 80 is bonded to the third side wall portion 322 of the second member 381 by the bonding member 330. The second side wall portion 114 of the first member 80 is bonded to the fourth side wall portion 324 of the second member 381 by the bonding member 330.

More specifically, the first inner surface 112a of the first side wall portion 112 is bonded to the first outer surface 322a of the third side wall portion 322 of the second member 381 by the bonding member 330. The second inner surface 114a of the second side wall portion 114 is bonded to the second outer surface 324a of the fourth side wall portion 324 of the second member 381 by the bonding member 330.

As shown in FIGS. 16A and 16C, the first and second connecting members 82 and 83 are disposed within the interior cavity 89 so as to prevent the first and second members 80 and 381 from being separated form each other until completion of attaching the first and second members 80 and 381 to each other via the bonding member 330. More specifically, the first and second connecting members 82 and 83 prevent the third and fourth side wall portions 322 and 324 from being separated from the first and second side wall portions 112 and 114 until completion of attaching the first and second members 80 and 381 to each other via the bonding member 330.

Since the second member 381 is made of the carbon fiber reinforced plastic, it is possible to save weight of the left crank arm 352 comparing with both shell members of a crank arm made of metallic material while obtaining necessary rigidity of the left crank arm 352.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This definition also applies to words of similar meaning, for example, the terms "have", "include" and their derivatives.

The term "attached" or "attaching", as used herein, encompasses configurations in which an element directly attached to another element by affixing the element is directly to the other element; configurations in which the element is indirectly attached to the other element via intermediate member(s); and configurations in which one element is integral with another element, i.e. one element is essentially part of the other element. This definition also applies to words of similar meaning, for example, "joined", "connected", "coupled", "mounted", "bonded", "fixed" and their derivatives.

The terms "member", "section," "portion," "part" or "element" when used in the singular can have the dual meaning of a single part or a plurality of parts.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein. For example, the invention can be practiced for other composite bicycle components besides a bicycle crank arm, e.g. a bicycle front sprocket, a bicycle rear sprocket, a bicycle crank axle, a bicycle hub axle, a bicycle brake lever, a bicycle shift lever, a bicycle front derailleur, a bicycle rear derailleur, a bicycle wheel, a bicycle hub assembly, a bicycle internal hub assembly, or the like.

The invention claimed is:

1. A composite bicycle component comprising:
   a first member made of metallic material, the first member including
      a first base portion,
      a first side wall portion extending from the first base portion, and
      a second side wall portion extending from the first base portion and being spaced apart from the first side wall portion in a first direction;
   a second member made of non-metallic material, the first and second members being configured to form an interior cavity therebetween in a state where the first and second members are attached to each other, the second member including
      a second base portion spaced apart from the first base portion in a second direction perpendicular to the first direction,
      a third side wall portion extending from the second base portion and being provided between the first side wall portion and the second side wall portion in the first direction, and
      a fourth side wall portion extending from the second base portion and being spaced apart from the third side wall portion in the first direction, the fourth side wall portion being provided between the first side wall portion and the second side wall portion in the first direction, the interior cavity being provided only directly between the third side wall portion and the fourth side wall portion when viewed along the first direction;
   a bonding member configured to attach the first and second members to each other;
   a first connecting member disposed in the interior cavity and configured to be connected to a crank axle;
   a second connecting member disposed in the interior cavity and configured to be connected to a pedal; and
   an inner holding member configured to be disposed only within the interior cavity between the first connecting member and the second connecting member so as to prevent the first and second members from being separated from each other until completion of attaching the first and second members to each other.

2. The composite bicycle component according to claim 1, wherein
   the bonding member includes resin.

3. The composite bicycle component according to claim 1, wherein
   the bonding member includes adhesive.

4. The composite bicycle component according to claim 1, wherein
   the first member includes aluminum.

5. The composite bicycle component according to claim 1, wherein
   the first member comprises iron.

6. The composite bicycle component according to claim 1, wherein
   the second member comprises fiber reinforced plastic, and
   the bonding member comprises adhesive to attach the second member to the first member.

7. The composite bicycle component according to claim 1, wherein
   the inner holding member is configured to be soluble in liquid.

8. The composite bicycle component according to claim 1, wherein
   the inner holding member includes an inflatable bag.

9. The composite bicycle component according to claim 1, wherein
   the interior cavity is provided between the first base portion and the second base portion when viewed along the second direction.

10. The composite bicycle component according to claim 1, wherein the first side wall portion is attached to the third side wall portion via the bonding member, and the second side wall portion is attached to the fourth side wall portion via the bonding member.

11. The composite bicycle component according to claim 1, wherein the first member has a cross section having a substantially U-shape defined by the first base portion, the first side wall portion, and the second side wall portion when viewed in a third direction that is orthogonal to the first direction and the second direction, and the second member has a cross section having a substantially U-shape defined by the second base portion, the third side wall portion, and the fourth side wall portion when viewed in the third direction.

12. The composite bicycle component according to claim 1, wherein the interior cavity is defined by a boundary formed by interior surfaces of the first base portion, the second base portion, the third side wall portion, and the fourth side wall portion when viewed in a third direction that is orthogonal to the first direction and the second direction.

13. A composite bicycle component comprising:

a first member made of metallic material;

a second member made of non-metallic material, the first and second members being configured to form an interior cavity therebetween in a state where the first and second members are attached to each other;

a bonding member configured to attach the first and second members to each other;

a first connecting member disposed in the interior cavity and configured to be connected to a crank axle;

a second connecting member disposed in the interior cavity and configured to be connected to a pedal; and an inner holding member configured to be disposed within the interior cavity between the first connecting member and the second connecting member so as to prevent the first and second members from being separated from each other until completion of attaching the first and second members to each other, wherein the first member includes aluminum, the second member includes non-metallic fiber material, and the bonding member includes resin and is dispersed into the second member to form fiber reinforced plastic.

14. A composite bicycle component comprising:

a first member made of metallic material;

a second member made of non-metallic material, the first and second members being configured to form an interior cavity therebetween in a state where the first and second members are attached to each other;

a bonding member configured to attach the first and second members to each other;

a first connecting member disposed in the interior cavity and configured to be connected to a crank axle;

a second connecting member disposed in the interior cavity and configured to be connected to a pedal; and an inner holding member configured to be disposed within the interior cavity between the first connecting member and the second connecting member so as to prevent the first and second members from being separated from each other until completion of attaching the first and second members to each other, wherein the second member comprises non-metallic fiber material, and the bonding member comprises resin and is dispersed into the second member to form fiber reinforced plastic.

15. A composite bicycle component comprising:

a first member made of metallic material;

a second member made of non-metallic material, the first and second members being configured to form an interior cavity therebetween in a state where the first and second members are attached to each other; and a bonding member configured to attach the first and second members to each other, the composite bicycle component being manufactured with a method comprising:

providing the first member;

providing the second member;

fitting the first and second members together;

providing the bonding member to the second member after fitting the first and second members together; and attaching the first and second members to each other through the bonding member by an integral molding process.

16. The composite bicycle component according to claim 15, further comprising:

an inner holding member, wherein the composite bicycle component is manufactured with the method further comprising:

providing the inner holding member between the first and second members before fitting the first and second members together.

17. The composite bicycle component according to claim 15, wherein the bonding member is provided to the second member by a vacuum-assisted-resin-transfer-molding process.

18. The composite bicycle component according to claim 17, further comprising:

an inner holding member, wherein the composite bicycle component is manufactured with the method further comprising:

providing the inner holding member between the first and second members before fitting the first and second members together.

19. The composite bicycle component according to claim 15, wherein the method further comprises providing a first connecting member between the first and second members before the fitting of the first and second members, the first connecting member being configured to be connected to a crank axle, providing a second connecting member between the first and second members before the fitting of the first and second members, the second connecting member being configured to be connected to a pedal, and providing an inner holding member between the first and second members and between the first and second connecting members before fitting the first and second members together.

20. The composite bicycle component according to claim 15, further comprising:

a first connecting member disposed in the interior cavity and configured to be connected to a crank axle;

a second connecting member disposed in the interior cavity and configured to be connected to a pedal; and an inner holding member configured to be disposed within the interior cavity between the first connecting member and the second connecting member so as to prevent the first and second members from being separated from each other until completion of attaching the first and second members to each other.

21. A method for manufacturing a composite bicycle component, the method comprising:

providing a first member;
providing a second member;
fitting the first and second members together;
providing a bonding member to the second member after fitting the first and second members together; and
attaching the first and second members to each other through the bonding member by an integral molding process.

22. The method according to claim 21, further comprising:
providing an inner holding member between the first and second members before fitting the first and second members together.

23. The method according to claim 21, wherein
the bonding member is provided to the second member by a vacuum-assisted-resin-transfer-molding process.

24. The method according to claim 23, further comprising:
providing an inner holding member between the first and second members before fitting the first and second members together.

25. The method according to claim 21, further comprising:
providing a first connecting member between the first and second members before the fitting of the first and second members, the first connecting member being configured to be connected to a crank axle;
providing a second connecting member between the first and second members before the fitting of the first and second members, the second connecting member being configured to be connected to a pedal; and
providing an inner holding member between the first and second members and between the first and second connecting members before fitting the first and second members together.

26. A composite bicycle crank arm comprising:
a first member made of metallic material, the first member including
 a first base portion,
 a first side wall portion extending from the first base portion, and
 a second side wall portion extending from the first base portion and being spaced apart from the first side wall portion in a first direction;
a second member made of non-metallic material, the first and second members being configured to form an interior cavity therebetween in a state where the first and second members are attached to each other, the second member including
 a second base portion spaced apart from the first base portion in a second direction perpendicular to the first direction,
 a third side wall portion extending from the second base portion and being provided between the first side wall portion and the second side wall portion in the first direction, and
 a fourth side wall portion extending from the second base portion and being spaced apart from the third side wall portion in the first direction, the fourth side wall portion being provided between the first side wall portion and the second side wall portion in the first direction, the interior cavity being provided only directly between the third side wall portion and the fourth side wall portion when viewed along the first direction;
a first connecting member disposed in the interior cavity and configured to be connected to a crank axle;
a second connecting member disposed in the interior cavity and configured to be connected to a pedal;
a bonding member configured to attach the first and second members to each other; and
an inner holding member configured to be disposed only within the interior cavity between the first connecting member and the second connecting member so as to prevent the first and second members from being separated from each other until completion of attaching the first and second members to each other.

27. The composite bicycle crank arm according to claim 26, wherein
the first member includes aluminum.

28. The composite bicycle crank arm according to claim 26, wherein
the second member includes fiber reinforced plastic.

29. The composite bicycle crank arm according to claim 28, wherein
the bonding member includes adhesive to attach the second member to the first member.

30. The composite bicycle crank arm according to claim 26, wherein
the inner holding member is configured to be soluble in liquid.

31. The composite bicycle crank arm according to claim 26, wherein
the inner holding member includes an inflatable bag.

32. The composite bicycle crank arm according to claim 26, wherein
the interior cavity is provided between the first base portion and the second base portion when viewed along the second direction.

33. The composite bicycle crank arm according to claim 26, wherein
the first side wall portion is attached to the third side wall portion via the bonding member, and
the second side wall portion is attached to the fourth side wall portion via the bonding member.

34. The composite bicycle crank arm according to claim 26, wherein
the first member has a cross section having a substantially U-shape defined by the first base portion, the first side wall portion, and the second side wall portion when viewed in a third direction that is orthogonal to the first direction and the second direction, and
the second member has a cross section having a substantially U-shape defined by the second base portion, the third side wall portion, and the fourth side wall portion when viewed in the third direction.

35. The composite bicycle crank arm according to claim 26, wherein
the interior cavity is defined by a boundary formed by interior surfaces of the first base portion, the second base portion, the third side wall portion, and the fourth side wall portion when viewed in a third direction that is orthogonal to the first direction and the second direction.

36. A composite bicycle crank arm comprising:
a first member made of metallic material;
a second member made of non-metallic material, the first and second members being configured to form an interior cavity therebetween in a state where the first and second members are attached to each other;
a first connecting member disposed in the interior cavity and configured to be connected to a crank axle;
a second connecting member disposed in the interior cavity and configured to be connected to a pedal;
a bonding member configured to attach the first and second members to each other; and an inner holding member configured to be disposed within the interior cavity between the first connecting member and the second connecting member so as to prevent the first and second members from being separated from each other until completion of attaching the first and second members to each other, wherein the first member includes aluminum, the second member includes non-metallic fiber material, and the bonding member includes resin and is dispersed into the second member to form fiber reinforced plastic.

\* \* \* \* \*